US005308439A

United States Patent [19]

Cronin et al.

[11] Patent Number: 5,308,439

[45] Date of Patent: May 3, 1994

[54] LATERNAL FIELD EMMISSION DEVICES AND METHODS OF FABRICATION

[75] Inventors: John E. Cronin, Milton; Kent E. Morrett, Essex Junction; Michael D. Potter, Grand Isle; Timothy D. Sullivan, Underhill, all of Vt.

[73] Assignee: International Business Machines Corporation, Armonk, N.Y.

[21] Appl. No.: 13,607

[22] Filed: Feb. 4, 1993

Related U.S. Application Data

[62] Division of Ser. No. 722,768, Jun. 27, 1991, Pat. No. 5,233,263.

[51] Int. Cl.[5] ........................ B44C 1/22; C03C 15/00; C03C 25/06; C23F 1/00

[52] U.S. Cl. .................................... 156/656; 156/644; 156/657; 156/659.1

[58] Field of Search ............... 156/643, 644, 653, 657, 156/656, 659.1, 661.1; 313/309; 437/41, 4, 228, 238, 241; 445/35, 46, 58

[56] References Cited

U.S. PATENT DOCUMENTS 5,106,652 4/1992 Sakamoto et al. .............. 156/657 X
5,127,990 7/1992 Pribat et al. ......................... 156/644

*Primary Examiner*—William A. Powell
*Attorney, Agent, or Firm*—Heslin & Rothenberg

[57] ABSTRACT

Lateral cathode field emission devices and methods of fabrication are set forth. Conventional integrated circuit fabrication techniques are advantageously used to produce the lateral FEDs. Cathode tips on the order of several hundred angstroms are consistently obtained as well as exact spacing of the cathode to gate and cathode to anode. Various cathode and device configurations are described, including a circular field emission device. A single integrated structure having multiple cathodes and multiple gates is possible to perform various logic operations and/or enhance current output from the device. Multiple field effect devices, with cathodes disposed parallel or perpendicular to the substrate, are integrally coupled through a sharing of one or more metallization layers definitive of the elements of the devices. Significant advantages in current density and circuit layout can be obtained. Methods for fabricating the various devices are also explained.

7 Claims, 19 Drawing Sheets

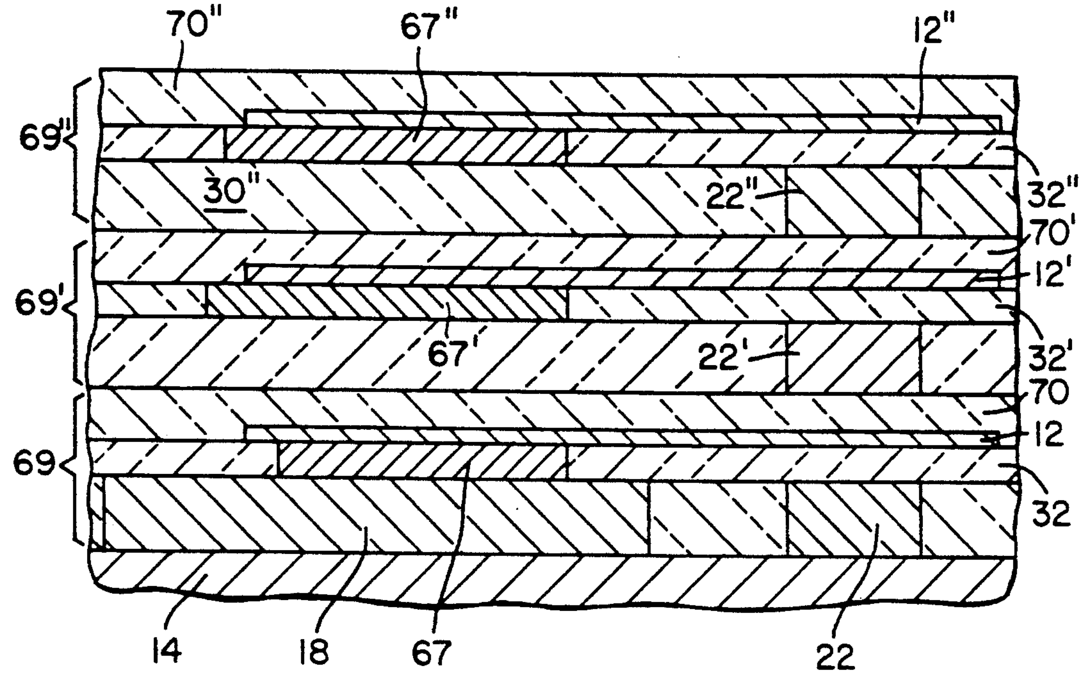
FIG. 11
FIG. 14
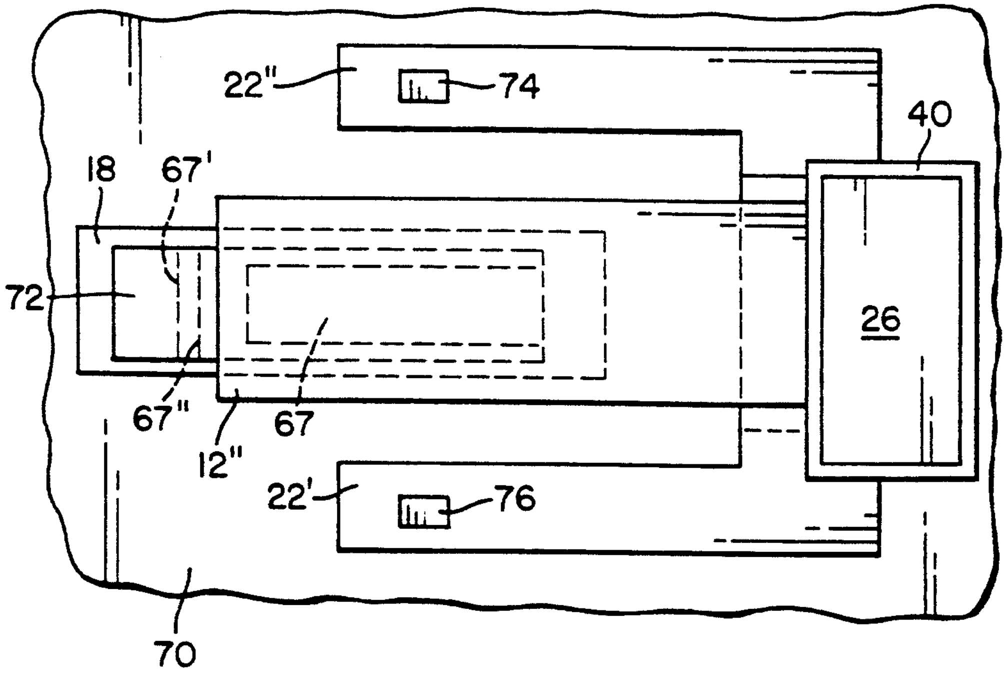

FIG. 15a
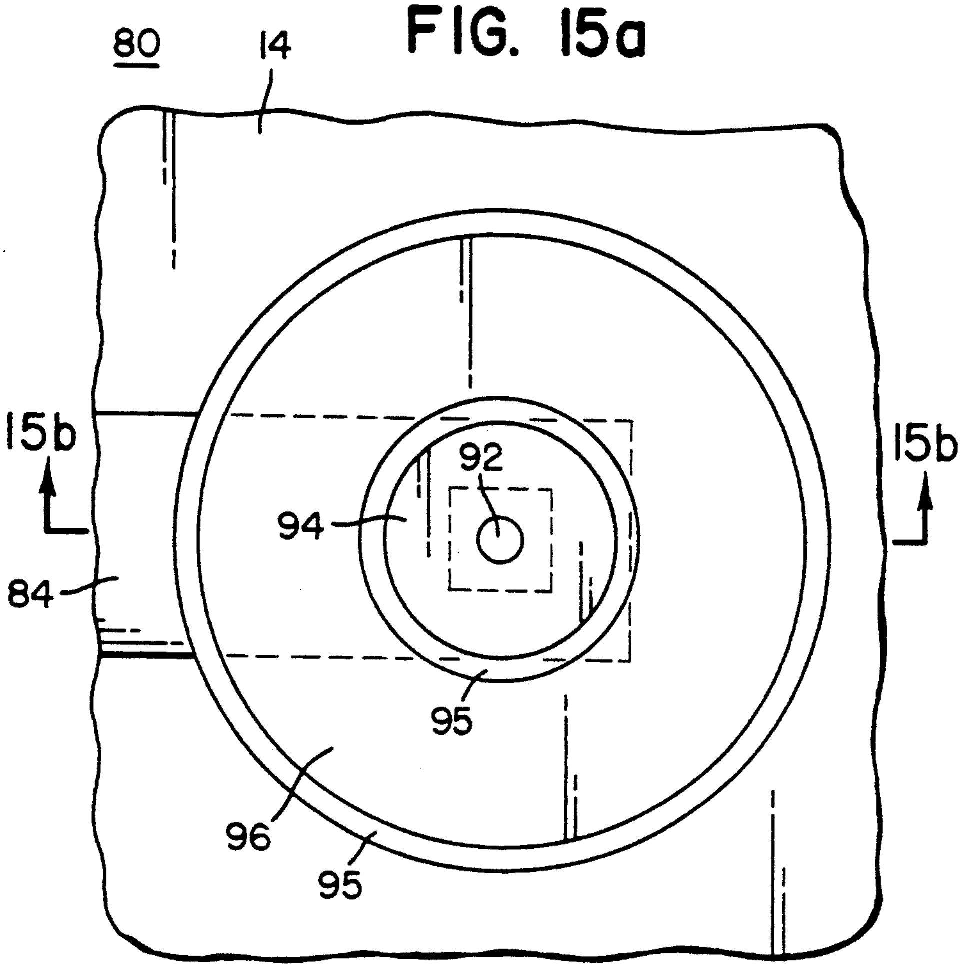
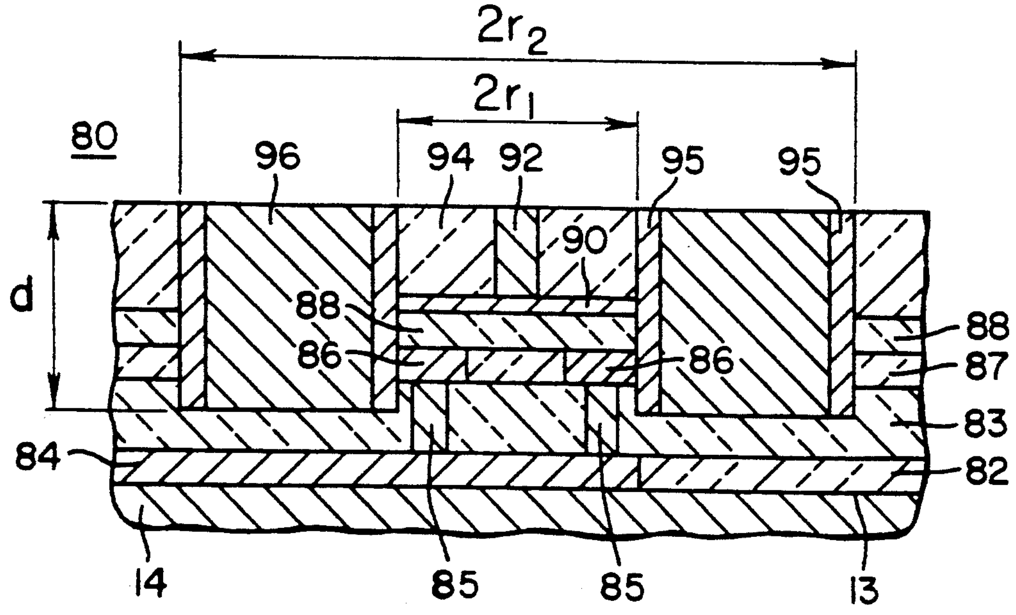
FIG. 15b

FIG. 18a
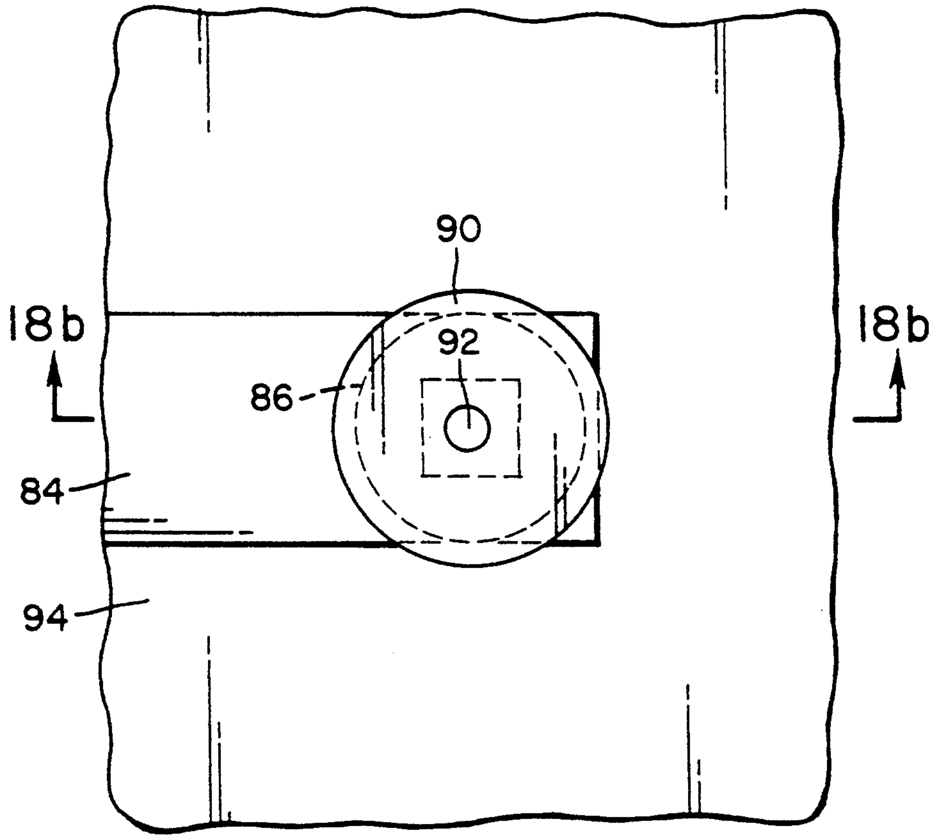
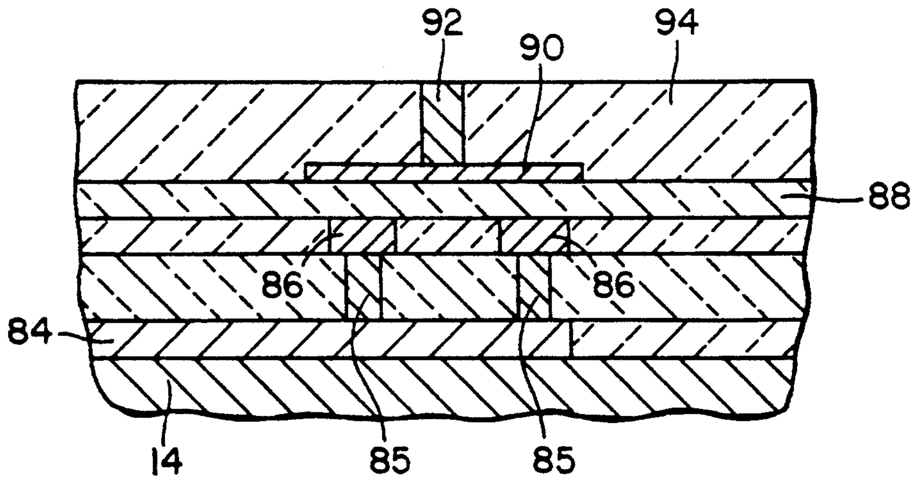
FIG. 18b

LATERAL FIELD EMMISSION DEVICES AND METHODS OF FABRICATION

This application is a division of application Ser. No. 07/722,768, filed Jun. 6, 1991, U.S. Pat. No. 5,233,263.

BACKGROUND OF THE INVENTION

1. Technical Field

This invention relates in general to integrated microelectronic devices having a field emission cathode structure and, more particularly, to novel lateral field emission device structures and methods of fabricating the same.

2. Description of the Prior Art

Field emission devices (FEDs) or micro-vacuum tubes have many advantages over conventional semiconductor silicon devices for signal and data processing. For example, FEDs are much faster switching in the terahertz regime, are temperature and radiation insensitive, and are relatively easy to construct. Applications range from discrete active devices to high density SRAMs and displays, radiation-hardened military applications and temperature insensitive space technologies, etc. The literature on field emission devices principally focuses on process problems associated with producing the sharpest tip (e.g., with photolithography), controlling cathode to anode and cathode to gate distances and achieving self-alignment between these elements. By way of example, reference is made to U.S. Pat. No. 4,990,766, entitled "Solid State Electron Amplifier," and U.S. Pat. No. 4,721,885, entitled "Very High Speed Integrated Microelectronic Tubes." In these devices, as in all known field emission devices, the sharply pointed tip of the cathode is the only physical structure that is not commonly produced by standard integrated circuit fabrication processes.

Activity in the field of cold cathode emission at VLSI levels has been increasing in the past few years. The present application is believed to further advance the state of this art by providing FEDs which have cathode tips produced by integrated circuit fabrication processes. Further, FED structures are provided with extremely fine cathode tips, exact control of cathode to anode distance and exact alignment of gate and cathode, along with precise distance control of gate to cathode. In addition, the cross-sectional area overlap of gate to cathode is kept low to minimize coupling capacitances. In another aspect, presently available field emission devices are often characterized by low active current. The typical solution to this problem has been to couple multiple structures in parallel, which works but is expensive in terms of the layout area required. The structures and methods of fabrication described below provide significant advantages in device current and circuit layout area.

SUMMARY OF THE INVENTION

Briefly described, in a basic embodiment of the present invention a novel lateral cathode, diode device is provided. This device includes a cathode member disposed to extend parallel to the upper surface of a substrate. One end of the cathode member includes a tip for emitting electrons by field emission, and the cathode member thickness is only several hundred angstroms. An anode member is positioned on the substrate so as to be exactly a preselected distance from the tip of the emitter cathode member. The anode member receives electrons emitted by field emission from the tip of the cathode member. Finally, metallization means for applying an electrical voltage to the cathode member and to the anode member are provided.

In a triode configuration, the field emission device includes a gate member disposed a preselected distance adjacent to the tip of the cathode member for controlling emission of electrons therefrom. The gate member is disposed above, below or both above and below the laterally extending cathode member. The metallization means also allows for the application of a biasing voltage to the gate member. Further, the anode member is preferably self-aligned to the cathode and gate members, while the cathode and gate members preferably terminate in the same plane. The termination plane is substantially orthogonal to the upper surface of the substrate. The space between the cathode and anode members can comprise a vacuum or contain a gas.

In another basic aspect, the device again includes a cathode member disposed so as to extend parallel to the upper surface of the substrate; but in this embodiment the cathode member has a circular shape. An anode member, positioned on the substrate a predetermined distance from the cathode member, is provided for receiving electrons emitted by field emission from the cathode member. Again, metallization means allow for the application of an electrical bias voltage to the cathode member and to the anode member. The anode member is preferably cylindrical and the cathode member is positioned to reside within the anode member. Also, a gate member can be disposed adjacent the electron emitter cathode member for controlling emission of electrons therefrom. As with the cathode member, the gate member is preferably disposed within the cylindrical anode member. The anode member is again self-aligned to the cathode member and the gate member, and the space between the anode and cathode can comprise a vacuum or contain a gas. As with the basic embodiment, the cathode member preferably has a thickness of only several hundred angstroms.

In another embodiment of the present invention, a field emission device is provided wherein a plurality of spaced cathode members are disposed vertically relative to a supporting substrate. Each of the cathode members has a tip at one end for emitting electrons by field emission and all of the cathode member tips are substantially aligned in the same direction. An anode member is positioned on the substrate in orthogonal-spaced-opposing relation to at least some of the tips of the cathode members. A plurality of gate members is also provided, wherein each gate member is disposed adjacent the tip of one of the cathode members for controlling the emission of electrons therefrom. Finally, metallization is provided for applying electrical bias voltage to each of the cathode members, anode member and gate members. In various embodiments, at least some of the gate members are electrically interconnected and/or at least some of the cathode members are electrically interconnected.

In another aspect, the present invention comprises various methods for fabricating a field emission device. In one basic embodiment, the fabrication method includes the steps of: disposing an ultra-thin, first metallic layer relative to the upper surface of a substrate so as to extend parallel thereto; overlying a first insulating layer on the first metallic layer; providing an opening through the first metallic layer and the first insulating layer; disposing a conformal layer of material of predetermined thickness within the opening; filling the opening at least partially with a second metallic layer such that the conformal layer exactly spaces the second metallic layer from the first metallic layer; and providing metallization for applying electrical bias voltage to the first metallic layer and to the second metallic layer, the bias voltage to be applied being sufficient to cause cold cathode emission from the ultra-thin first metallic layer to the second metallic layer. Numerous enhancements to the fabrication method are also described and claimed herein.

In yet another aspect, the invention comprises an integrated structure of multiple field emission devices. In the integrated structure, a first field emission device is provided having three metallic layers. Each of the metallic layers comprises either a first cathode member, a first anode member or a first gate member. A second field emission device is integrally coupled to the first field emission device. The second field emission device also has three metallic layers, each of which comprises a second cathode member, a second anode member, or a second gate member. The field emission devices are integrally coupled such that one of the first cathode member, first anode member and first gate member metallic layers also comprises one of the second cathode member, second anode member and second gate member metallic layers. Integration in an analogous manner can be accomplished for any desired number of field emission devices.

In all aspects, the present invention is directed to lateral field emission devices which can be built using existing microelectronic fabrication techniques and which have extremely fine cathode tips. Further, the devices described herein exactly control the cathode to anode distance (to reduce device operating voltage and reduce device to device variability) and the cathode to gate distance (to control the gate to cathode overlap, and thereby control the coupling capacitances). Finally, the gate and cathode structures are inherently aligned and the anode structure is self-aligned to the gate and cathode members. Further, the devices described herein have improved layout density and, in certain embodiments, increased active current, thereby producing higher power output per unit area devices than previous approaches. Lastly, the integrated structure approach described reduces the number of interconnections between devices, thus reducing costs, and increasing device reliability and performance, along with offering significant design flexibility.

BRIEF DESCRIPTION OF THE DRAWINGS

These and other objects, advantages and features of the present invention will be more readily understood from the following detailed description of certain preferred embodiments of the present invention, when considered in conjunction with the accompanying drawings in which:

FIG. 11 is a cross-sectional elevational view of a multi-cathode field emission device having three levels of cathode/gate members in accordance with the present invention;

FIG. 14 is a plan view of an alternate embodiment of a multi-cathode field emission device in accordance with the present invention wherein separate contacts to at least two different gate members are provided;

FIG. 15*a* is a plan view of another embodiment of a field emission device in accordance with the present invention;

FIG. 15*b* is a cross-sectional elevational view of the field emission device of FIG. 15*a* taken along line 15*b*—15*b;*

FIG. 16a is a plan view of an intermediate microelectronic assembly during fabrication of the field emission device of FIG. 15a;

FIG. 18a is a plan view of the microelectronic assembly of FIGS. 17a and 17b after provision of an external metallization contact to the cathode member;

FIG. 18b is a cross-sectional elevational view of the assembly of FIG. 18a taken along line 18b—18b;

DETAILED DESCRIPTION OF THE INVENTION

Reference now should be made to the drawings in which the same reference numbers are used throughout the different figures to designate the same or similar components.

Figure 1:
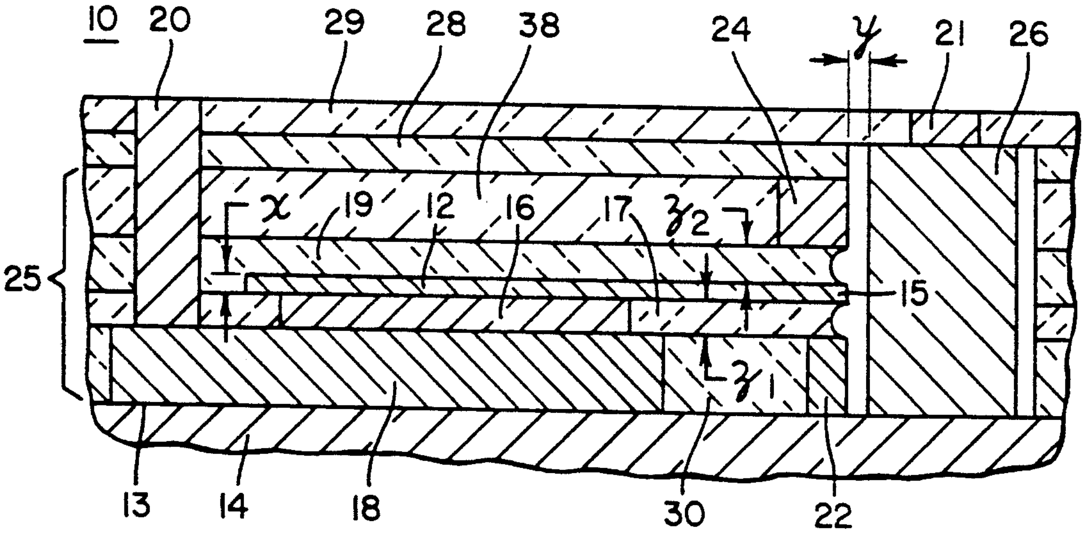
FIG. 1 is a cross-sectional elevational view illustrating a field emission device in accordance with the present invention.
Figure 2A:
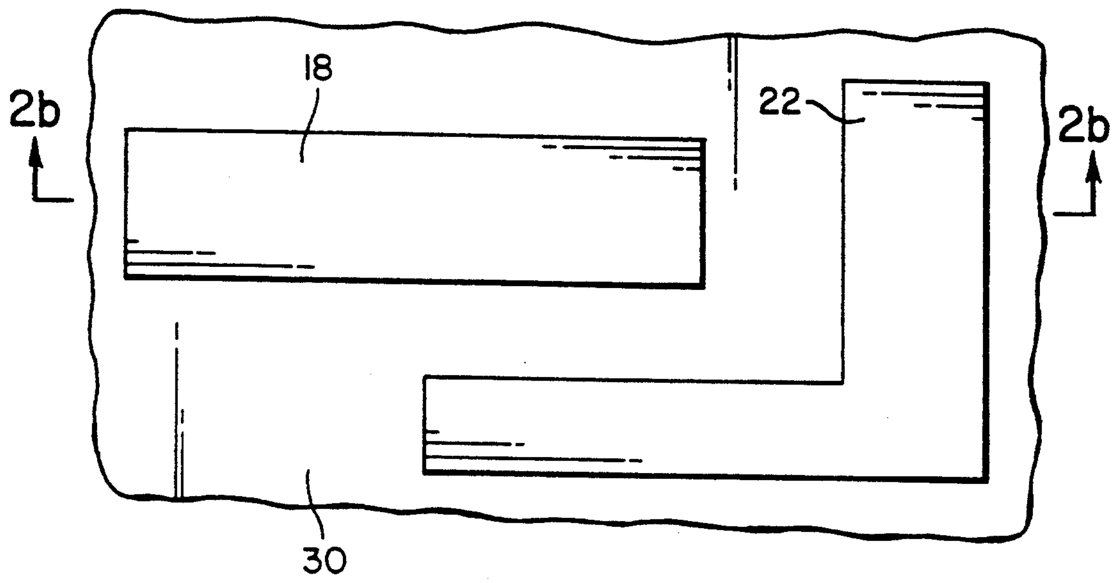
FIG. 2*a* is a plan view of a microelectronic assembly after a first step in the fabrication process of the field emission device of FIG. 1 pursuant to the present invention.
Figure 2B:
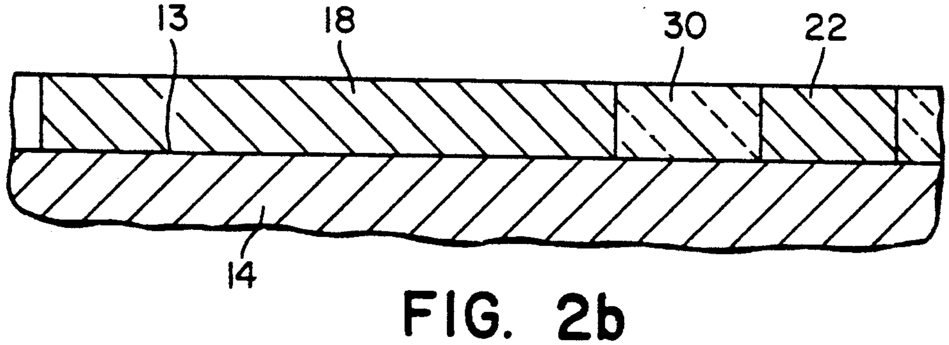
FIG. 2*b* is a cross-sectional elevational view of the assembly of FIG. 2*a* taken along line 2*b*—2*b;*
Figure 3A:
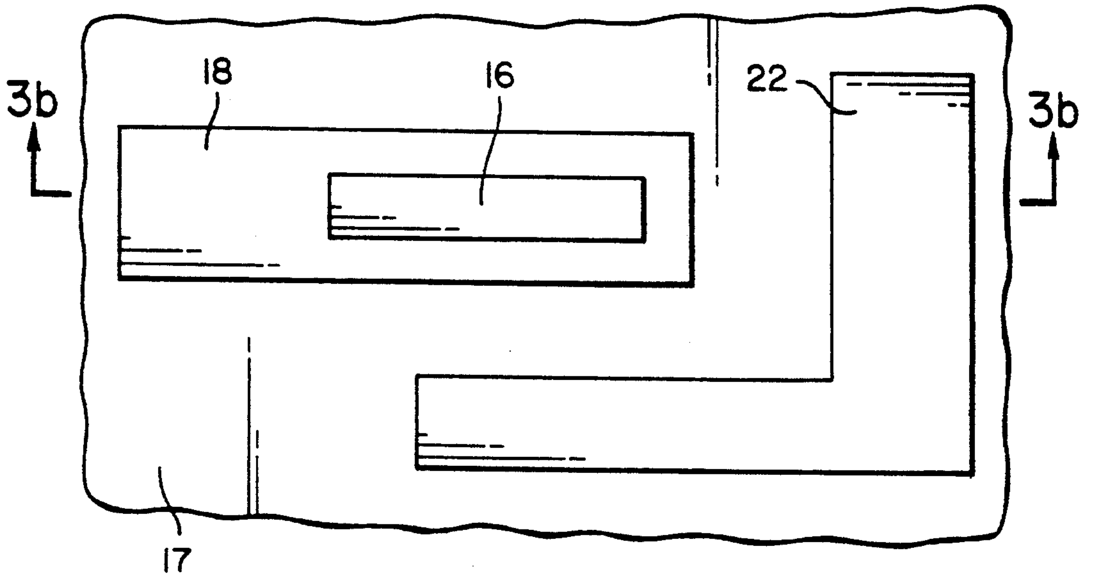
FIG. 3*a* is a plan view of the microelectronic assembly of FIGS. 2*a* and 2*b* after a second step in the FED fabrication process pursuant to the present invention.
Figure 3B:
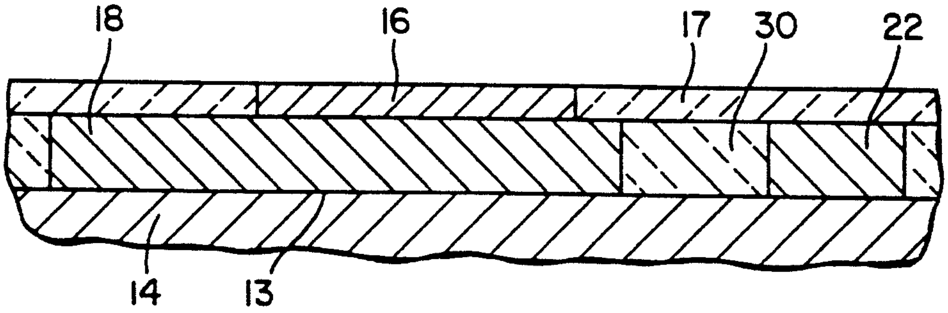
FIG. 3*b* is a cross-sectional elevational view of the assembly of FIG. 3*a* taken along line 3*b*—3*b;*
Figure 4A:
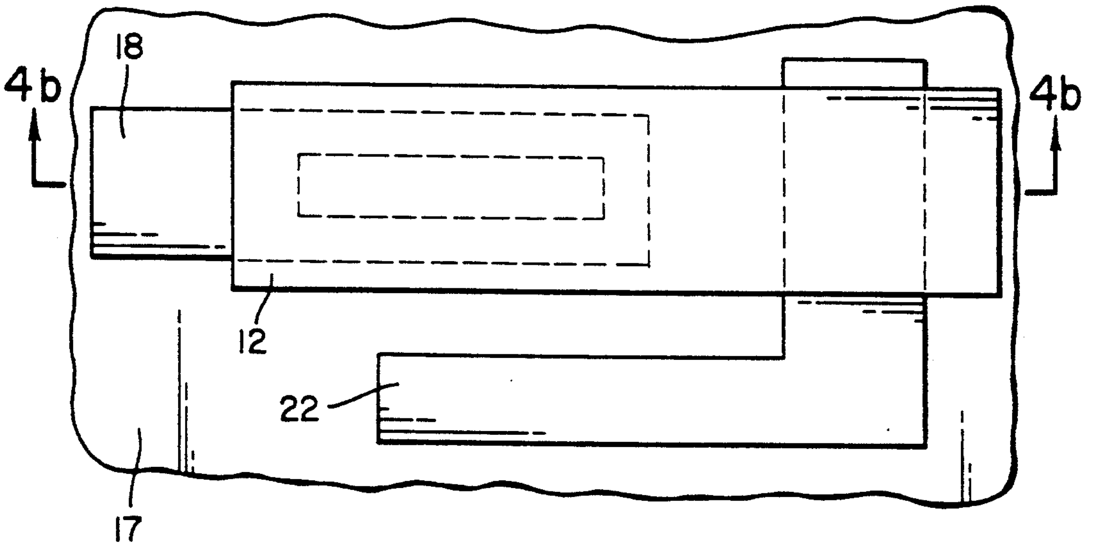
FIG. 4*a* is a plan view of the microelectronic assembly of FIGS. 3*a* and 3*b* after a third step in the field emission device fabrication process of the present invention.
Figure 4B:
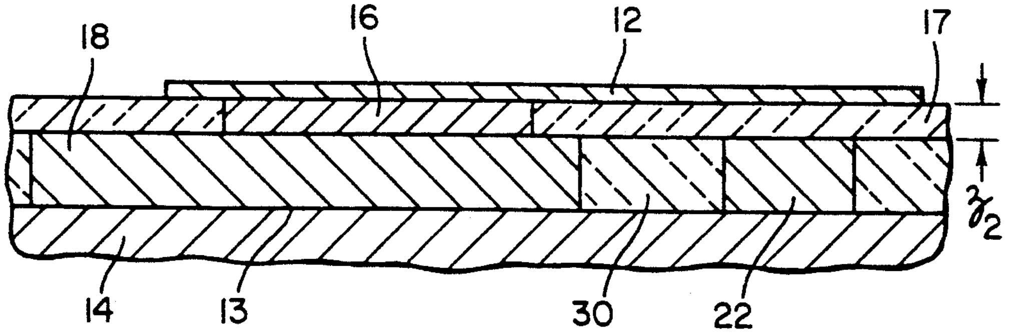
FIG. 4*b* is a cross-sectional elevational view of the assembly of FIG. 4*a* taken along line 4*b*—4*b;*
Figure 5A:
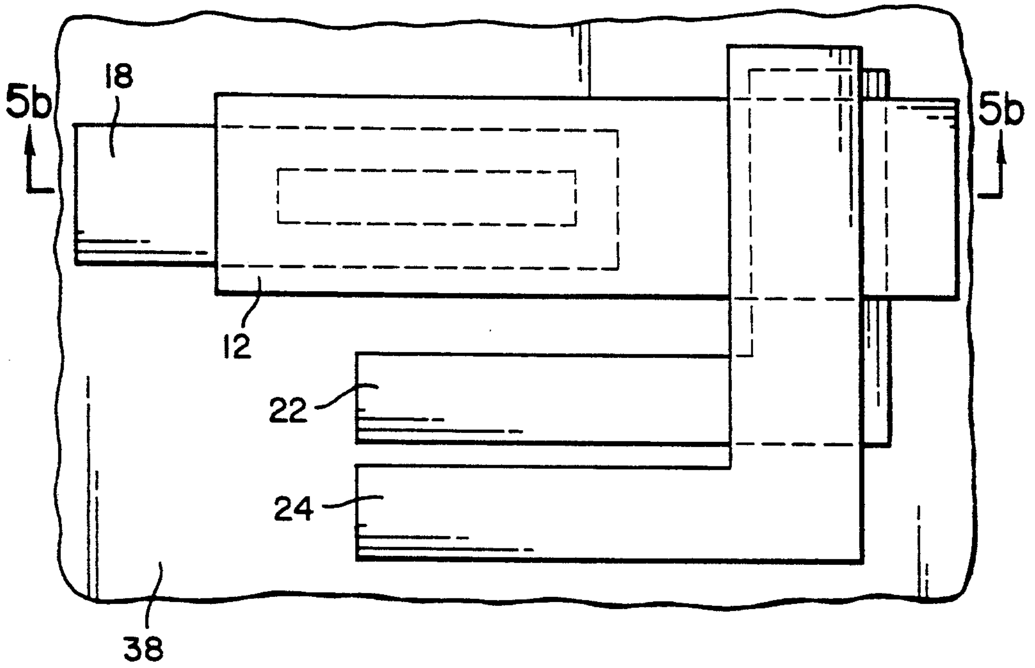
FIG. 5*a* is a plan view of the microelectronic assembly of FIGS. 4*a* and 4*b* existing after a fourth fabrication step pursuant to the present invention.
Figure 5B:
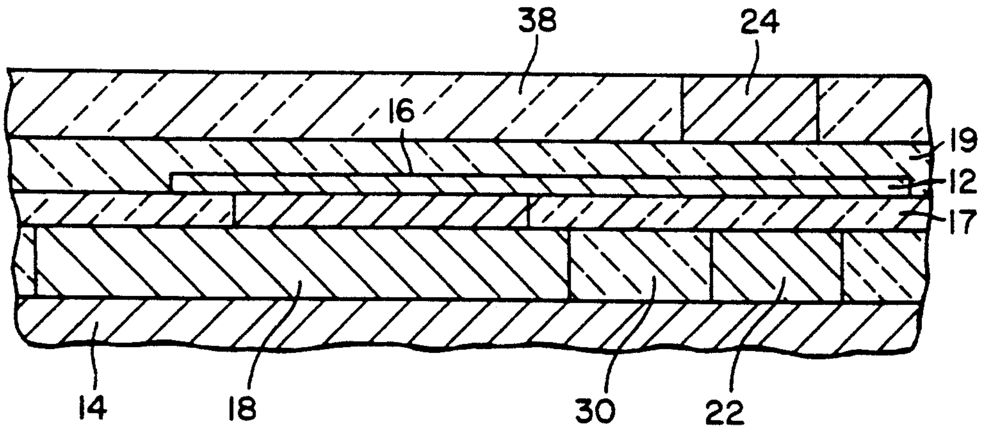
FIG. 5*b* is a cross-sectional elevational view of the assembly of FIG. 5*a* taken along line 5*b*—5*b;*
Figure 6A:
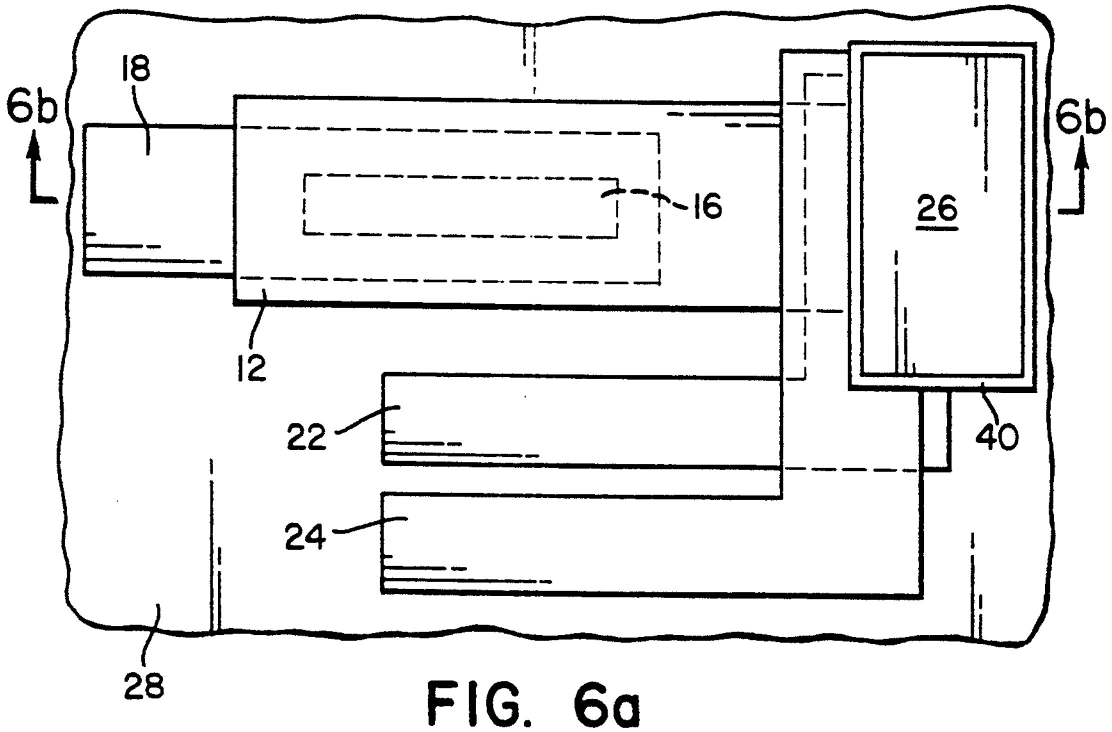
FIG. 6*a* is a plan view of the microelectronic assembly of FIGS. 4*a* and 4*b* after a fifth fabrication step pursuant to the present invention.
Figure 6B:
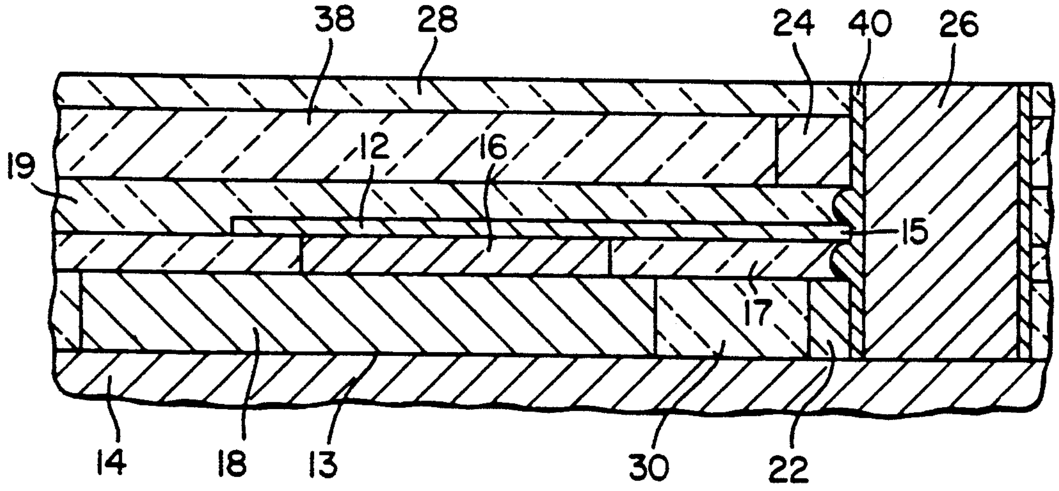
FIG. 6*b* is a cross-sectional elevational view of the assembly of FIG. 6*a* taken along line 6*b*—6*b;*
Figure 7A:
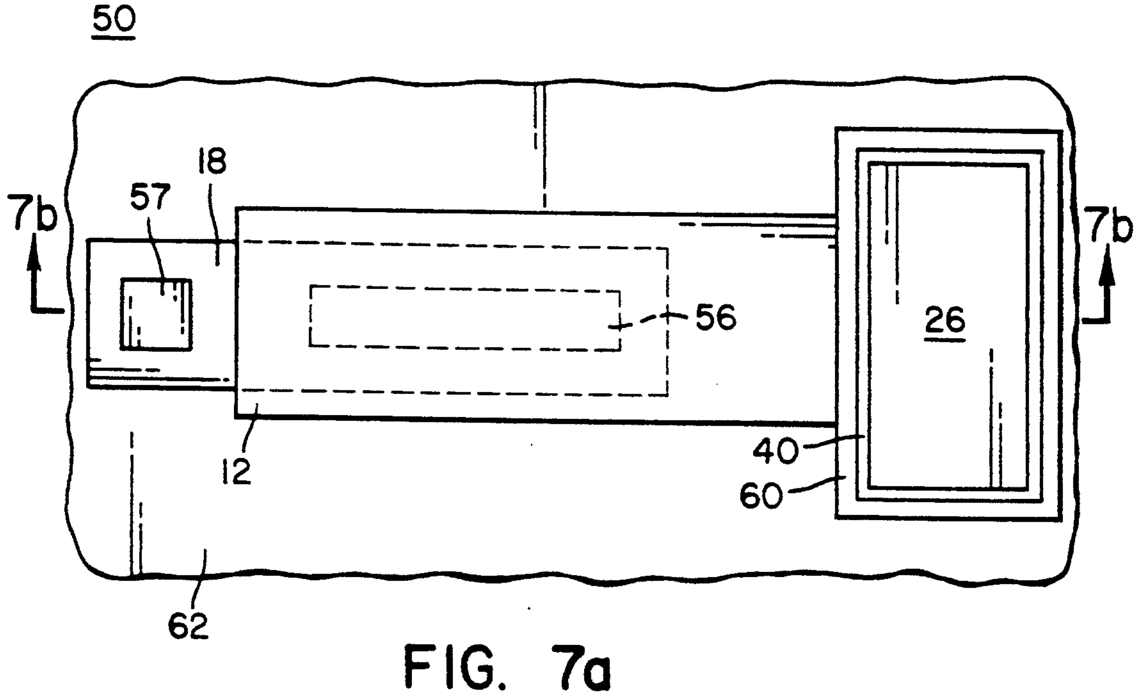
FIG. 7*a* is a plan view of an alternate embodiment of a field emission device pursuant to the present invention.
Figure 7B:
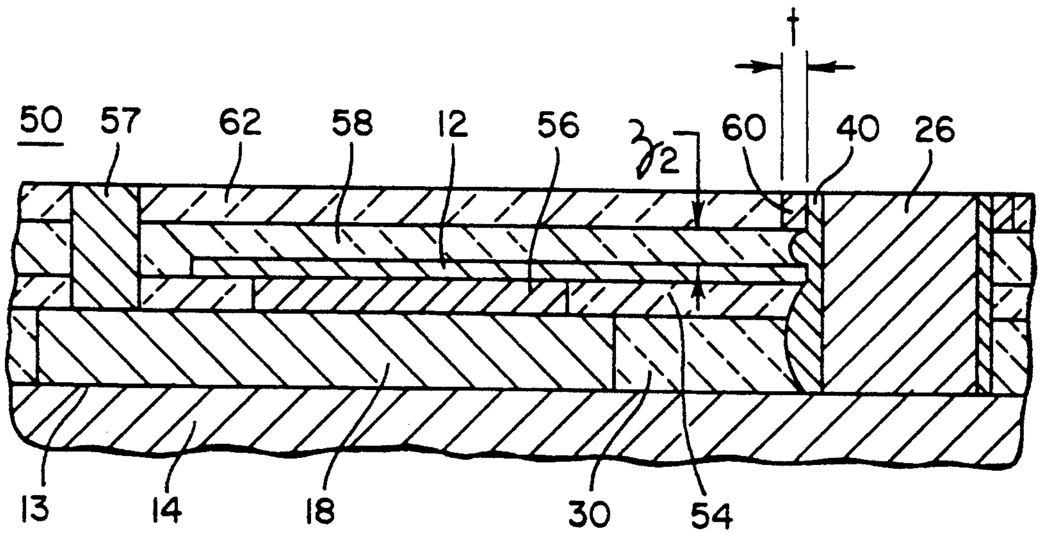
FIG. 7*b* is a cross-sectional elevational view of the field emission device of FIG. 7*a* taken along line 7*b*—7*b;*

One embodiment of a field emission device (FED) pursuant to the present invention, generally denoted 10, is depicted in cross-section in FIG. 1. FED 10 includes an ultra-thin emitter or electron emitting cathode member 12 which is disposed laterally relative to the upper surface 13 of a supporting substrate 14. As described further herein, member 12 preferably comprises a thin film of tungsten or titanium nitride, for example, of 100-200 angstroms in thickness "x". Physical vapor deposition techniques may be used to produce cathode 12. Substrate 14 can comprise any glass, metal, ceramic, etc., capable of withstanding the elevated temperatures (e.g., 450° C.) typically encountered during the device fabrication process described below. Cathode 12 is electrically coupled to the upper surface of FED 10 via a metallic spacer 16, a base plate 18, which is disposed on upper surface 13 of substrate 14, and an external contact channel 20.

As explained further below, metallic spacer 16 is defined in a dielectric layer 17 (e.g., oxide) which separates a lower grid or gate member 22 from cathode member 12 and, in particular, separates the tip 15 of member 12 from gate 22. By way of example, oxide layer 17 thickness "$z_1$" may be approximately 1000 angstroms. This thickness is minimized to obtain uniform and low device turn on voltage. A second oxide layer 19 separates cathode 12 from an upper gate 24. Preferably, gates 22 and 24 are electrically interconnected, as discussed below. The thickness "$z_2$" of insulating layer 19 is also on the order of 1000 angstroms. Further, if desired, the exposed insulating layers 17 and 19 may be partially etched as shown (in a dilute HF dip) to reduce gate 22, 24 to cathode 12 leakage and capacitance. Further, if desired a metal etch can be employed to optimize the tip 15 of metal cathode 12.

A plate or anode member 26 is disposed in spaced opposing relation to the laterally extending cathode/-gate stack 25. A sealant layer 29, such as oxide, is disposed over the entire device. The space between the cathode 12 and anode 26 preferably comprises a vacuum (e.g., $10^{-6}$-$10^{-7}$ torr.), however, this is not essential. For example, the space could be filled with any gas, such as Helium or air. Also, although not drawn to scale, the distance "y" between the cathode/gate stack 25 and anode 26 may be at least 5 times and, preferably, roughly 10 times the width "$z_i$" of insulating layers 17 and 19. Thus, in one embodiment, distance "y" is approximately one micron. (Note that the drawings are not drawn to scale.)

It should be observed that pursuant to the present invention, the cathode to gate thickness "$z_i$" and the cathode to anode thickness "y" are each exactly and consistently controlled by film thickness (layers 17 and 19) and spacer thickness (described below), respectively. Further, one or both of these thicknesses will be below the smallest dimension obtainable with conventional photolithographic processing. The device operating voltages are controlled by the cathode to anode distance "y" and by the gate to cathode distances "$z_1$" and $z_2$, which as noted is exactly defined by the spacer width, as described further below. The gate voltage requirement is minimized by advantageously disposing the cathode tip in the same "termination plane" relative to the gate edge as shown, and by minimizing distance "$z_1$". This termination plane is substantially orthogonal to the upper surface of the substrate. Since ultra-thin cathode 12 is preferably created by physical vapor deposition techniques, such as evaporation, sputtering or ion deposition, its thickness may be accurately controllably varied as desired. Also, because cathode 12 is only several hundred angstroms thick, the radius of curvature at tip 15 of the rectangular cathode member 12 is very well defined. An important advantage of the present invention is the definition of cathode tip 15 without the use of photolithographic processing techniques.

One preferred FED fabrication method in accordance with the present invention is described below with additional reference to FIGS. 2a-6b hereof.

Fabrication of device 10 begins by patterning and etching a layer of dielectric material, such as oxide 30, disposed on substrate 14 as shown in FIGS. *2a* and *2b*. A blanket chemical vapor deposition of tungsten fills areas 18 and 22, which is then followed by planarization of the assembly so that the tungsten resides only in the patterned oxide grooves (see FIG. *2b*). The thickness of oxide 30 and the metallization disposed therein can be selected for optimization of device characteristics. As a typical example, layer 30 may be approximately 5000 angstroms. The L-shaped pattern is used for lower gate 22 in order to provide sufficient area for subsequent metallization of an external contact to the gate. Base plate 18 will serve as a landing area through which external contact to cathode 12 may be made.

The next fabricated layer to FED 10 is depicted in FIGS. *3a*–*3b*. In this step, conductive metal spacer 16 is created by chemical vapor deposition of tungsten in a second patterned and etched dielectric material, such as oxide 17 (see FIG. *3b*). This layer or film is preferably on the order of 1000 angstroms thick since oxide 17 will form the spacer between lower gate 22 and the cathode member to be formed next. Also, conventional mask and etch procedures are used throughout the fabrication process unless stated otherwise. The configuration of the mask used for etching and metallization of oxide 17 is selected to ultimately reduce the contact resistance between spacer metal 16 and the subsequently formed cathode, as well as base plate 18. Also, the configuration of the mask is selected to lower the series resistance of the subsequently formed cathode member.

A very thin, for example, several hundred angstrom thick layer or film of metal 12 is next defined by physical deposition techniques followed by masking and etching away of the metal at all undesired locations of the stack. As is well known in the art, masking (with, for example, photoresist) is accomplished over that portion of the metal that is not to be removed, while maintaining exposed the unwanted portion. The exposed portion is then removed by subjecting the multi-layer structure to a metal etching process. There are several different etching processes available to those skilled in the art. (Note that the present invention is not limited by the particular masking and etching approaches used at any of the fabrication stages discussed herein.) Preferably, metal 12 is tungsten or titanium nitride.

As shown in FIG. *4b*, cathode metallization 12 makes contact to spacer metal 16 and is separated from lower gate 22 by the thickness "$z_i$" of oxide layer 17. Next a layer of oxide 19 (FIG. *5b*) is deposited over cathode member 12. Once oxide 19 is formed overlying the cathode, another layer of oxide 38 is deposited thereon and patterned for CVD-tungsten deposition of an upper gate member 24. As shown in FIG. *5a*, upper gate 24 has an L-shape and is slightly offset from lower gate 22 to ultimately allow separate external metallization contact therewith, i.e., if desired. Alternatively, gate 24 could be aligned over gate 22 in which case a single external metallization contact could connect to both gates. Further, it should be noted that gate 22, cathode 12, and gate 24 are each at least partially aligned vertically. The importance of this is evident from the following discussion.

Subsequent overlay of gate 24, another layer of oxide 28 (FIGS. *6a* and *6b*) is deposited, masked and etched to provide an opening for definition of anode member 26. This etching simultaneously 'aligns' the edges of the gates 22 and 24 and the tip 15 of the cathode 12 by etching through an area of the assembly where all three structures are vertically aligned. Next, oxide 17 and 19 in the aligned wall of stack 25 is preferably etched back in buffered HF to reduce surface leakage. Prior to formation of member 26, a thin conformal layer of a spacer material 40, for example, paralyene or silicon nitride, is deposited over oxide 28 and within the opening etched for the anode metallization. The thickness of this spacer material is very exactly controlled since it will constitute the distance between the cathode and anode members. Thereafter, a unidirectional etch removes all spacer material extending horizontally above the oxide and the upper surface of the substrate, while retaining the spacer material on the walls of the etched opening defined for the anode. Next, tungsten, or an aluminum copper alloy is deposited into this opening to form anode member 26 and planarized to a level even with the upper surface of dielectric layer 28.

As a preferred processing step, the field emission device is sealed with another dielectric layer 29 (see FIG. 1) and an opening is provided therein to expose paralyene spacer 40, which is then removed (evaporated) in a well known process by the application of heat (e.g., 200° C.) in the presence of oxygen. In addition, vacuum pressure may be created in the space between cathode/gate stack 25 and anode member 26 once the paralyene is removed. As a final step, the opening (not shown) in dielectric layer 29 to the space between anode 26 and cathode 12 members is sealed and the oxide is further patterned for the disposition of separate metallization contacts to the cathode member (12), gate members 22 and 24, and anode member (26) for the subsequent application of electrical biasing voltages to each of the members.

An alternate embodiment of a field emission device in accordance with the present invention is next described with reference to FIGS. *7a*–*8c*.

In this embodiment, the field emission device, generally denoted 50, includes a substrate 14 having an upper surface 13 upon which is disposed an oxide layer 30 which is patterned for a base plate 18. A first spacer dielectric layer 54 has a metallization layer 56 patterned therein which couples the electron emitting cathode member 12 to base plate 18. An external metallization contact 57 is disposed to extend between the upper surface of FED 50 and base plate 18 for applying electrical bias voltage to cathode member 12 via plate 18 and conductive metal spacer 56. A second spacer dielectric layer 58 overlies cathode member 12 and separates the member from a gate structure 60. Preferably, the thickness "$z_2$" of dielectric layer 58 over member 12 is on the order of 1000 angstroms, which as noted is a desirable thickness to provide threshold voltage control. After disposition of oxide layer 58, a further oxide layer 62 is provided to overlie layer 58. By way of example, oxide layer 62 may also be approximately 1000 angstroms thick. Layer 62 is patterned for definition of an opening into which metallization layer 26 is deposited, i.e., subsequent conformal layering of paralyene spacer 40 on the side walls of the opening as described above with reference to the embodiment of FIGS. 1–*6b*.

It will be recognized by those skilled in the art that FED 50 departs from FED 10 in that the lower gate structure and previous upper gate structure are omitted. Instead, gate control structure 60 is formed by patterning, etching back and metallizing oxide layer 62. This forms a vertical edge along spacer 40. Next, a thin spacer gate of CVD-tungsten metal layer is deposited and anisotropically etched back to create a spacer gate which surrounds anode member 26 and is spaced therefrom by paralyene. Preferably, the thickness "t" of spacer metal 60 is only approximately 200–300 angstroms, which serves to minimize the coupling capacitance between the gate and cathode. (As with the first FED embodiment, capacitance may be further minimized by undercutting oxide layers 58 and 54 from between gate member 60 and cathode member 12 in order to reduce the effective dielectric constant of the material therebetween.)

Figure 8A:
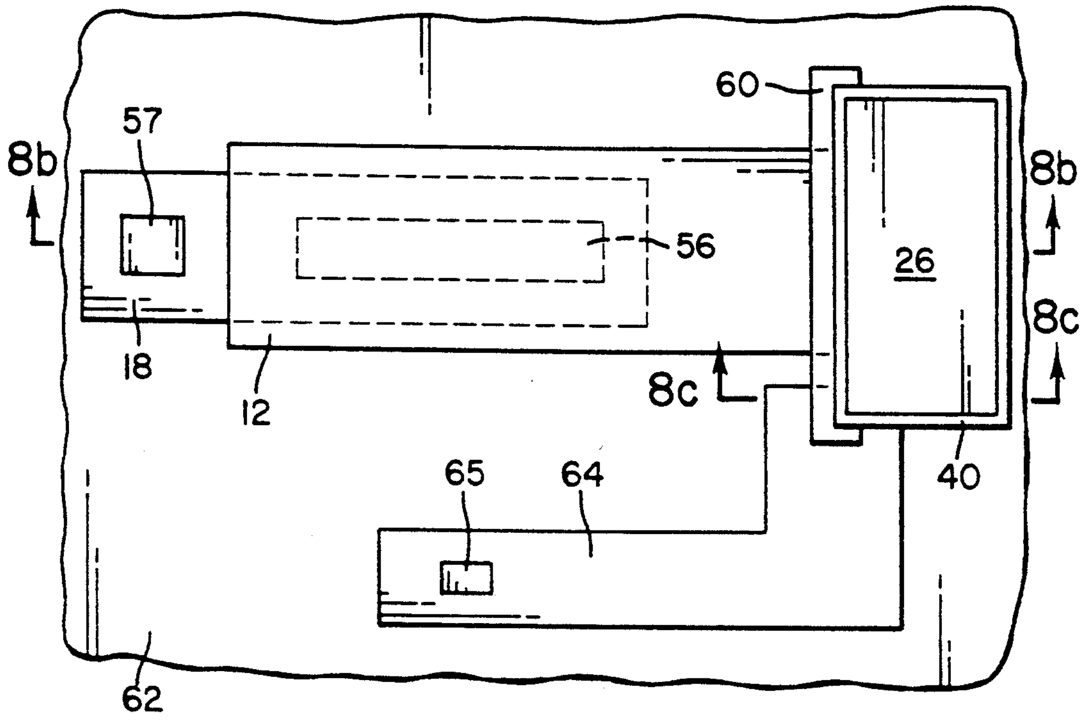
FIG. 8*a* is a plan view of a more complete embodiment of the field emission device of FIGS. 7*a* and 7*b;*
Figure 8B:
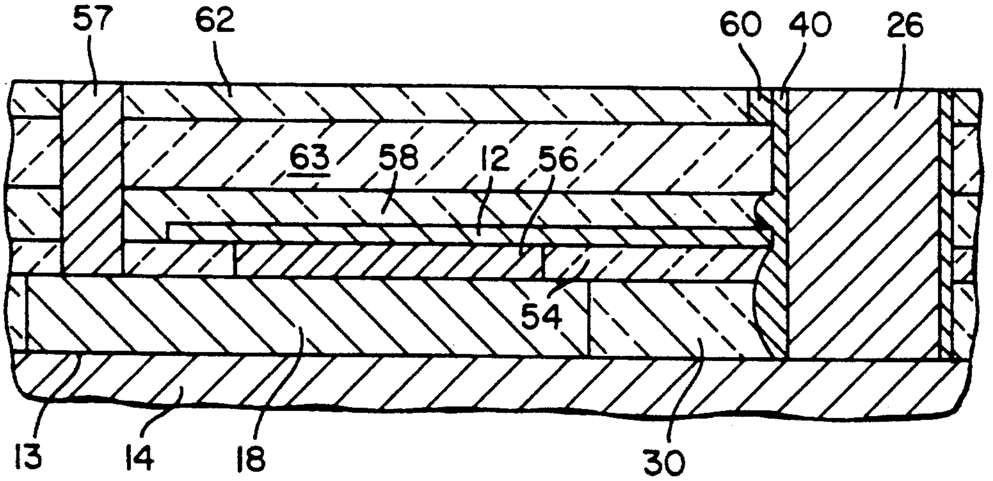
FIG. 8*b* is a cross-sectional elevational view of the field emission device of FIG. 8*a* taken along line 8*b*—8*b;*
Figure 8C:
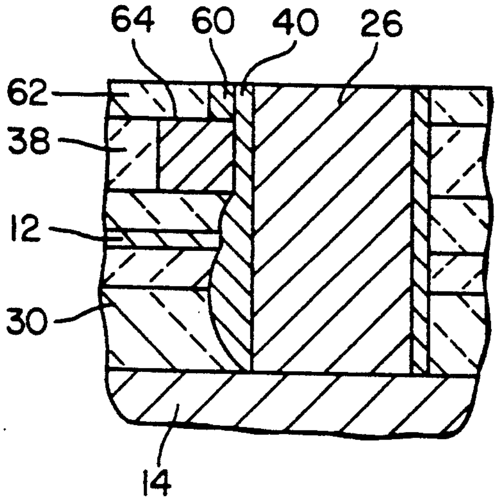
FIG. 8*c* is a cross-sectional elevational view of the field emission device of FIG. 8*a* taken along line 8*c*—8*c;*

FIGS. 8*a*–8*c* depict a more complete FED structure based on device 50 of FIGS. *7a* and *7b*. As shown, a further dielectric layer 63, disposed between layers 58 and 62, is provided within which a metal is deposited and patterned to define an L-shaped gate metallization 64 to spacer gate 60. Gate metallization 64 is offset from cathode member 12 so as not to increase the coupling capacitance between the gate and the cathode. External metallization contact 65 connects with spacer gate 60 via L-shaped metallization 64. Finally, spacer metal 60 is preferably removed from those areas not substantially overlying cathode member 12.

Figure 9:
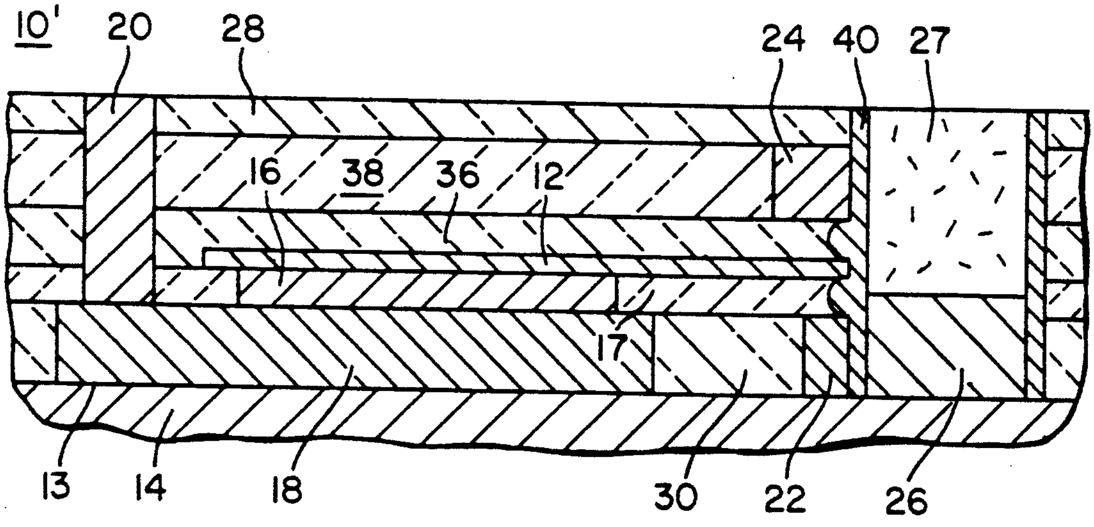
FIG. 9 is a cross-sectional elevational view of an enhanced embodiment of a field emission device in accordance with the present invention which includes a layer of phosphorous.

FIG. 9 depicts a further structural variation of the field emission device of FIGS. 1–6*b*. In this embodiment, device 10' has a layer of phosphorous material 27 disposed above anode member 26 and opposite cathode member 12 such that electrons emitted from member 12 flow to member 26 through the phosphorous material 27, thereby causing its illumination. Fabrication of this structure is accomplished as described above in connection with the referenced figures, except that after the formation of conformal spacer 40, metal layer 26 is deposited, planarized and anisotropically etched back so as to fill only a portion of the opening etched in the device. The objective is that the height of layer 26 from upper surface 13 of substrate 14 must be below the height of cathode member 12 from the upper substrate surface. Lastly, the upper portion of the etched opening is filled with phosphorus material 27, which, as noted, illuminates with the flow of electrons from cathode 12 to anode 26.

Those skilled in the art will recognize that numerous variations to the basic field emission device structure of the present invention are possible. As one straightforward variation, the gate member(s) could be omitted from the FED structure, thereby resulting in the creation of a novel diode structure. The balance of this discussion is dedicated to an explanation of certain additional variations on the basic field emission device.

For example, various embodiments of a multi-emitter field emission device pursuant to the present invention are depicted in FIGS. 10*a*–14. As explained below, these devices comprise vertical multi-layer structures of stacked cathode/gate members built which are capable of using conventional microelectronic fabrication techniques. Those skilled in the art will recognize that the structures described have improved layout density and are capable of increased active current in comparison with the single cathode FEDs discussed above. A multi-emitter field emission device pursuant to the present invention includes a plurality of laterally directed cathodes which are stacked vertically relative to the upper surface of a substrate, with each cathode of the stack having a corresponding gate member for control of electrons emitted therefrom. The resulting structure thus has a plurality of interleaved cathode and gate members. As with the prior field emission device embodiments, the anode member is self-aligned with respect to the corresponding plurality of cathodes and gates through a selective etching of the vertically aligned structures to produce an appropriate opening to accommodate the anode metallization layer.

Figure 10A:
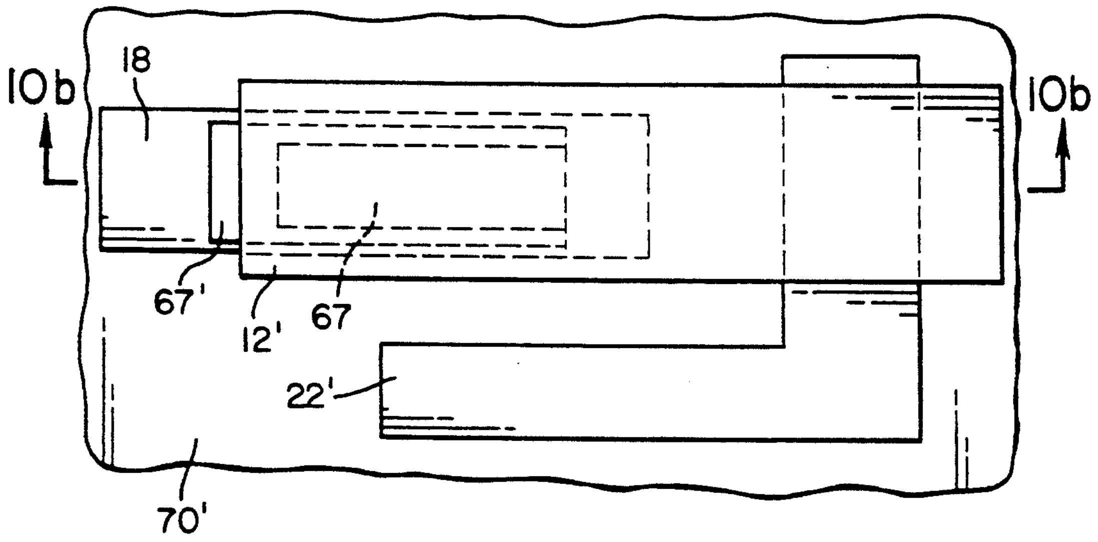
FIG. 10*a* is a plan view of a multi-cathode field emission device in accordance with the present invention.
Figure 10B:
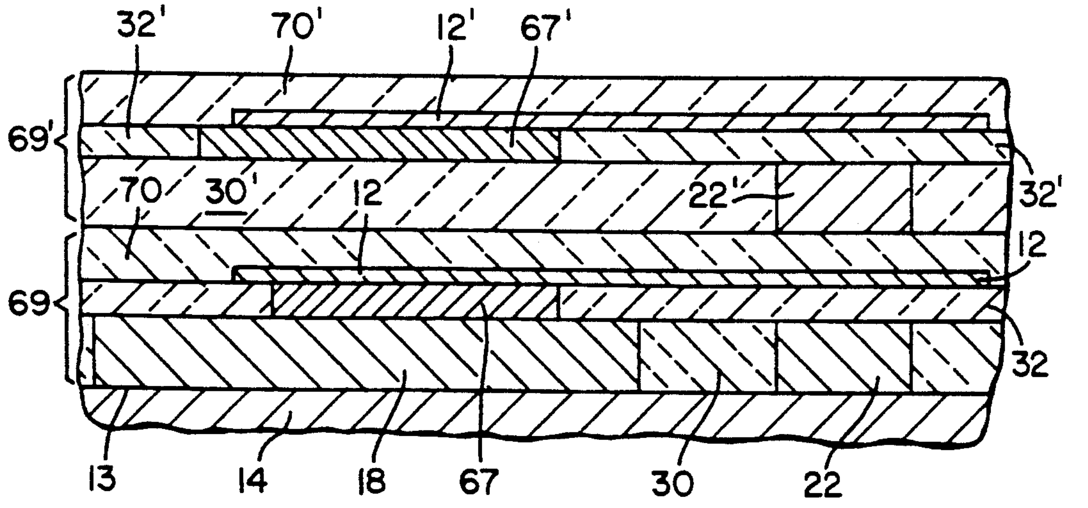
FIG. 10*b* is a cross-sectional elevational view of the field emission device of FIG. 10*a* taken along line 10*b*—10*b;*

Fabrication of the multi-emitter FED structure proceeds utilizing the integrated circuit fabrication techniques described above. In particular, referring first to FIGS. 10*a* 10*b* cathode/gate combination 69 is formed. A dielectric layer 30 is disposed on upper surface 13 of substrate 14; layer 30 is patterned for base plate 18 metallization and a first L-shaped gate member 22 metallization is patterned, as previously explained. Next, a dielectric spacer layer 32 is positioned to overlie patterned layer 30. Layer 32 is selected to provide a desired spacing between gate 22 and a first cathode 12. Preferably, a spacer plate 67 is patterned in layer 32 for facilitating external contact to cathode 12 as described below. Next, cathode 12 is deposited by physical vapor deposition techniques and patterned on the upper surface of layer 32 as shown. The first cathode/gate combination 69 is then isolated from the upper cathode/gate combination 69' by disposition of a relatively thick dielectric layer 70 over cathode member 12. In this first multi-cathode embodiment, each cathode/gate member combination is roughly vertically aligned with the other combinations in the stack. However, spacer plate 67' is preferably slightly laterally extended as shown in FIG. 10*b* to facilitate connection of an external contact to cathode 12' as described below. Cathode 12 comprises an ultrathin layer of, for example, tungsten or titanium nitride, having all of the characteristics described initially herein in connection with the single cathode FED structures.

The next cathode/gate combination 69' is fabricated in the identical manner as the first cathode/gate combination 69. Further, the dimensions for each cathode and gate are preferably similar, if not identical. If desired, one or more of the vertically aligned cathodes could be fabricated with a tip of a different shape than the remaining cathodes, for example, pointed versus planar. Those skilled in the art will recognize that the shape can be selectively varied to attain different device characteristics.

Figure 13A:
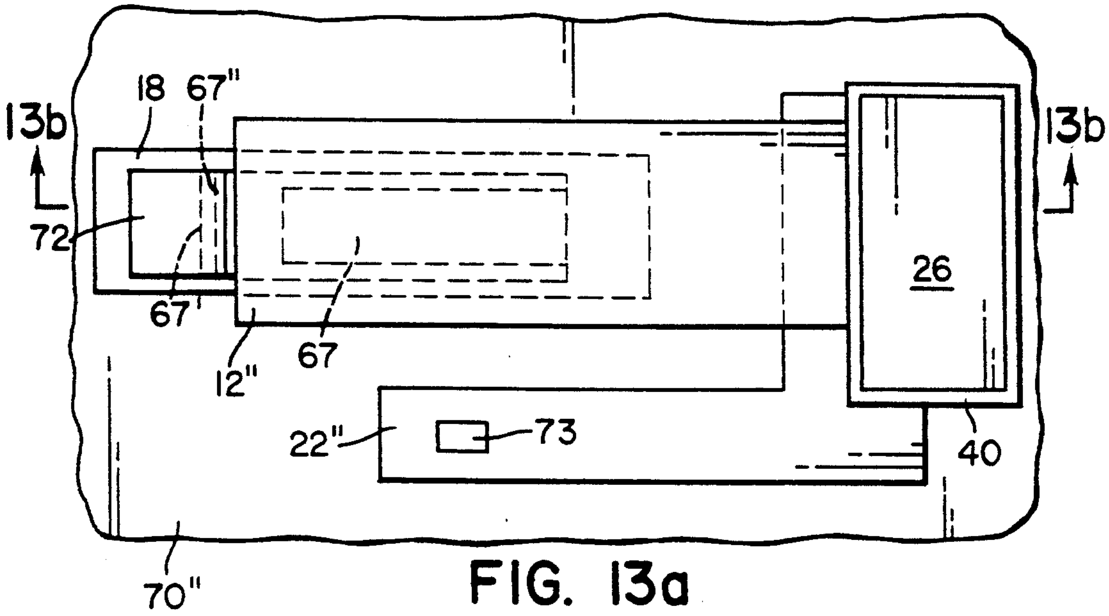
FIG. 13*a* is a plan view of the assembly of FIG. 12*a* subsequent the addition of external metallization contacts to the cathode members and the gate members.
Figure 13B:
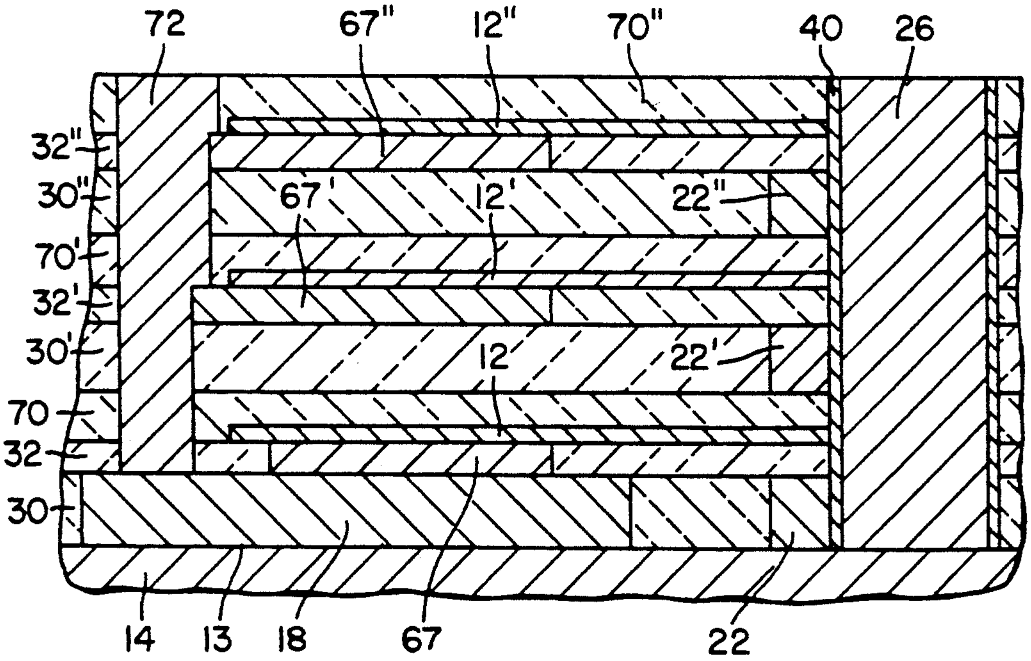
FIG. 13*b* is a cross-sectional elevational view of the field emission device of FIG. 13*a* taken along line 13*b*—13*b;*

In FIG. 11, a third cathode/gate combination 69'' is added and vertically aligned with the first and second combinations. As described, a dielectric layer 30'' is disposed over insulating layer 70' and patterned to accommodate gate member 22'', which has an L-shaped configuration similar to that of gate member 22' depicted in FIG. 10*a*. Next, insulating spacer layer 32'' is disposed over the assembly and patterned for spacer plate 67'', which as shown has a slightly smaller lateral dimension than plate 67'. This is to facilitate external contact to the spacer plates as shown in FIG. 13*b*. Thereafter cathode 12'' is deposited and patterned over layer 32'' and plate 67''. A protective insulating layer 70'' finally is disposed over the third cathode 12''. It will be recognized that more than three cathode/gate combination stacking is possible, and that the number included in any particular multi-emitter structure will typically be dictated by the desired device characteristics or functions.

Figure 12A:
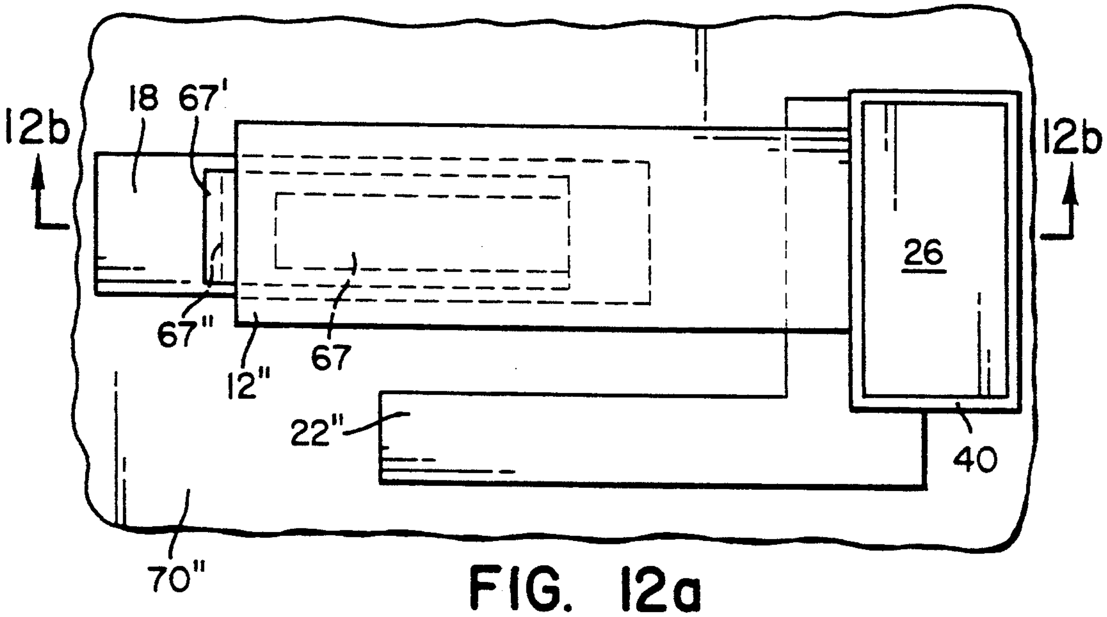
FIG. 12*a* is a plan view of the assembly of FIG. 10*a* subsequent the addition of an anode member.
Figure 12B:
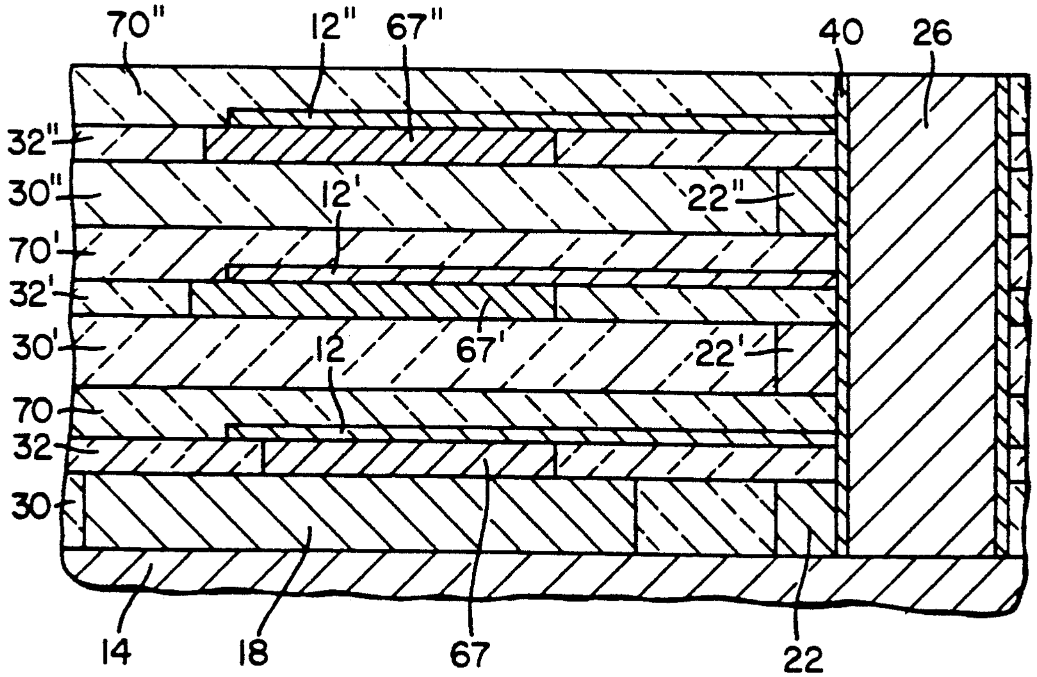
FIG. 12*b* is a cross-sectional elevational view of the assembly of FIG. 12*a* taken along line 12*b*—12*b;*

Assuming that a three cathode/gate combination FED is to be constructed, then the next step is to mask dielectric layer 70'' for the etching of an opening through the vertically aligned cathodes 12, 12', 12'' and gates 22, 22' and 22'' as shown in FIGS. 12*a* and 12*b*. A conformal spacing layer 40 and anode member 26 are created as described above. The multi-emitter structure is completed by providing external metallization contacts to each of the vertically aligned cathodes and gates. For the cathodes, this is accomplished by etching an opening through the various insulator layers 70″, 32″, 30″ 70′, 32′, 30′, 70, 32, to base plate 18 disposed on upper surface 13 of substrate 14 (see FIGS. 13*a* and 13*b*). The etchant is selected to form an opening only through the insulative layers and not any exposed conductor regions, i.e., spacer plates 67″ and 67′. As noted above, base plate 18 is on the order of 5000 angstroms thick which provides a reasonable amount of metallization within which to terminate an external cathode contact 72 metallized within the etched opening. Termination of external contact 72 at the first cathode 12 would be very difficult given the ultra-thin thickness of the cathode members. As shown in FIG. 13*b*, cathode 12′ is contacted through spacer plate 67′ and cathode 12″ is contacted through spacer plate 67″. In an alternate embodiment (not depicted), external contact 72 could be positioned to pass through the stacked device to base plate 18 without directly contacting the spacer plates 67″ and 67′. In such a structure, contact could be completed by fabricating the device to include metallized support structures or "stud-ups" through each of the fabrication layers, thereby connecting the cathode structures to base plate 18. As a further alternate embodiment, those skilled in the art will recognize that the length and configuration of each cathode structure could be varied to provide for separate external electrical contact to each cathode. This would allow the application of different bias voltages to the cathodes.

A separate metallization contact 73 connects each of the aligned gate members. Alternatively, each cathode/gate combination could be independently controlled through the electrical bias voltage applied to the respective gate members 22, 22′, 22″. FIG. 14 depicts a plan view of one embodiment wherein two different external gate contacts 74 and 76 are provided. Assuming the same three-level cathode/gate combination device of the previous figures, then either external metallization contact 74 or contact 76 electrically connects two of the gate members 22, 22′ and 22″, which are obviously necessarily aligned. As a further alternative, each of the gate control members could be provided with a different configuration which would allow separate external electrical contact thereto. Further, those skilled in the art will recognize that by providing a means to separately bias each of the gate members, various multiple node logic devices could be readily created, for example, logic OR or NAND gates. Gate member configurations are not intended to be limited to the L-shaped configurations depicted herein. Rather, any convenient configuration may be used as long as each gate member has an area which overlies its corresponding cathode so that upon the formation of an opening through the device for metallization of the anode member, the anode becomes self-aligned to both the cathode and the gate members (in addition to automatically aligning the edge of the gate with the corresponding cathode tip). The shape of the gate members should obviously be selected, however, to minimize the area required for layout of the field emission device.

An alternate embodiment of a single-cathode field emission device pursuant to the present invention, generally denoted 80, is depicted in FIGS. 15*a* and 15*b*. As shown, this vacuum emission device is based on the use of a circular cathode/gate/anode assembly. The particular structure is believed to achieve a higher power output (current output) per unit area than any other possible approach. This FED design takes maximum advantage of the electric fields necessary for turning on the device.

Figure 16A:
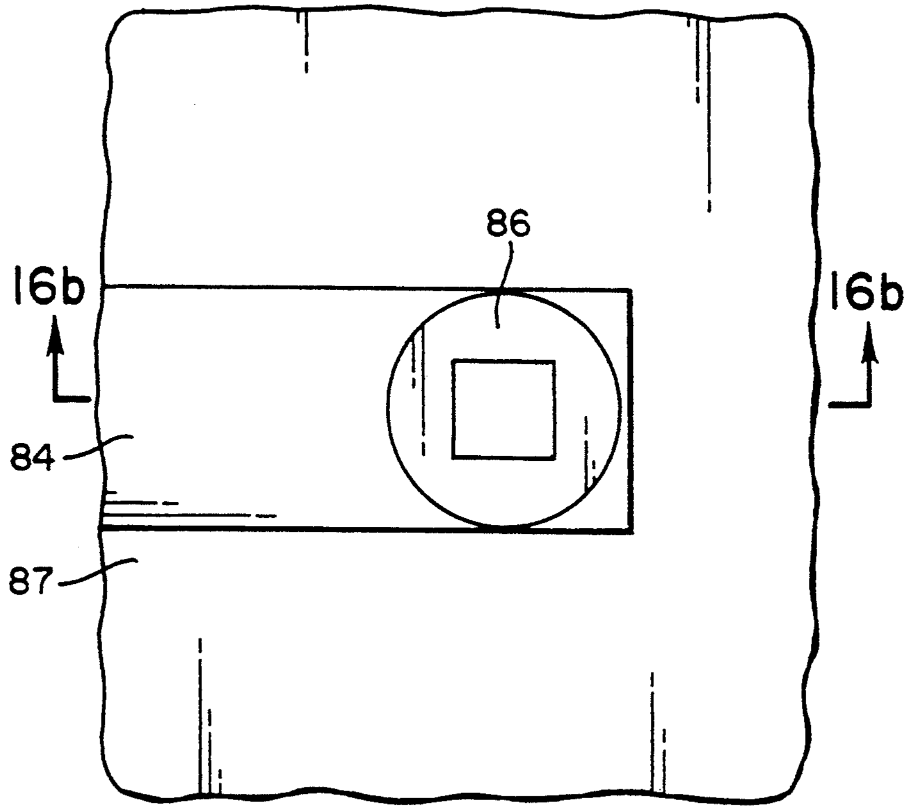
Figure 16B:
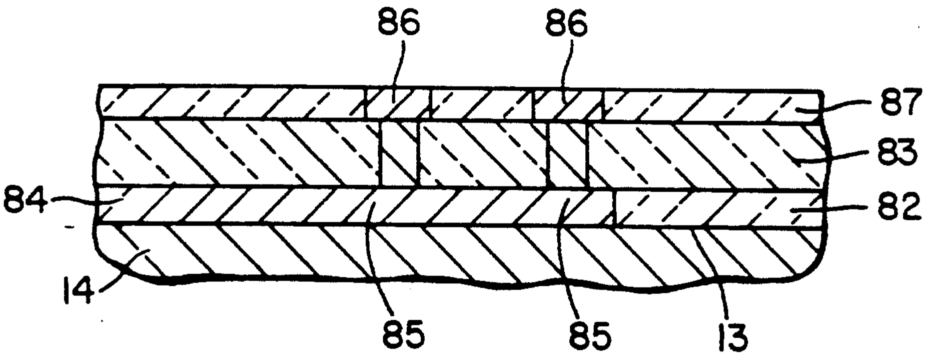
FIG. 16b is a cross-sectional elevational view of the assembly of FIG. 16a taken along line 16b—16b.
Figure 17A:
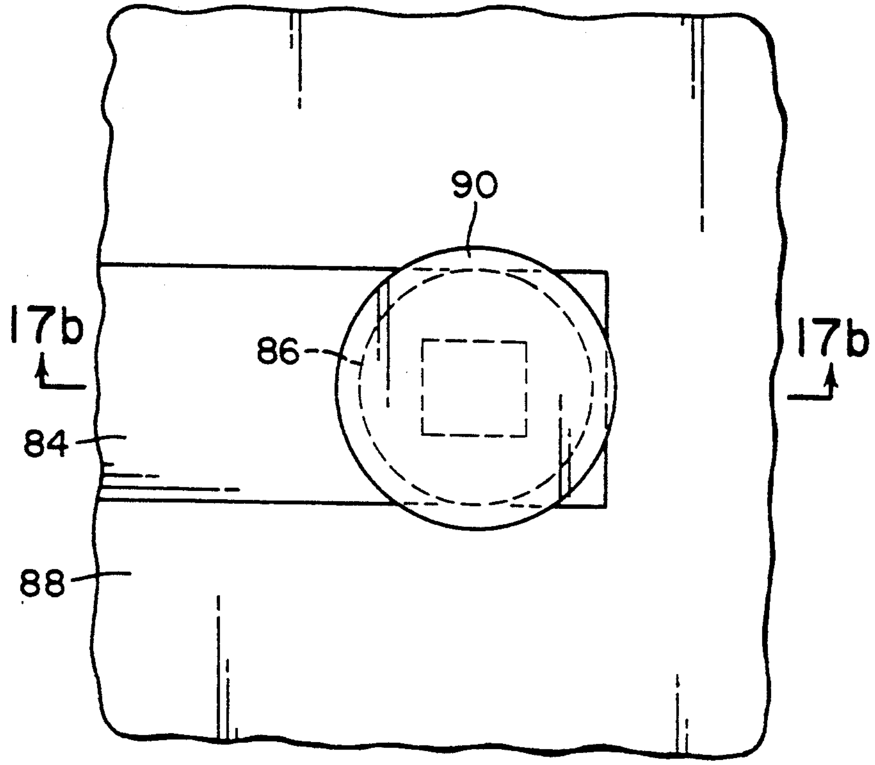
FIG. 17a is a plan view of a microelectronic assembly of FIGS. 16a and 16b after fabrication of an cathode member.
Figure 17B:
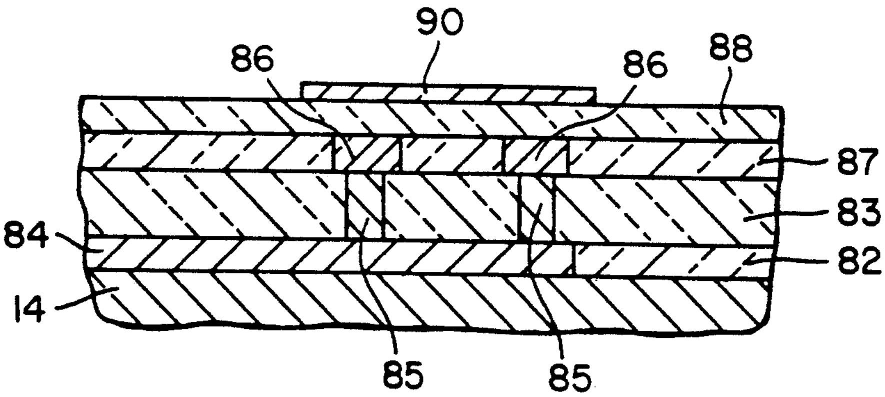
FIG. 17b is a cross-sectional elevational view of the assembly of 17a taken along line 17b—17b.

Referring now to FIG. 16*a* and FIG. 16*b*, a first oxide layer 82 is disposed on the upper surface 13 of a substrate 14. Dielectric layer 82 is patterned for a base metallization contact 84, which will be used to electrically contact the gate structure 86. A simple "stud-up" technique provides metallized contacts 85 between base plate 84 and gate member 86. In FIGS. 17*a* and 17*b* a thin spacer dielectric layer 88 separates gate member 86 from cathode layer 90. As with the previous FED embodiments, spacer layer 88 is preferably thin, e.g., approximately 1000 angstroms thick, while cathode 90 is fabricated to have an ultra-thin thickness of only several hundred angstroms. In FIGS. 18*a* and 18*b*, an external metallization contact 92 to cathode 90 is provided in an upper dielectric layer 94 which covers cathode 90. As with the other embodiments, a spacer plate (not shown) could be patterned in a portion of the dielectric surrounding cathode 90 to facilitate electrical coupling to the cathode member. In an alternate embodiment, gate member 86 and its corresponding cathode member could be transposed such that base contact plate 84 would allow external contact to the cathode.

As shown in FIGS. 15*a* and 15*b*, in the resultant device structure cathode 90 and gate 86 each have a circular configuration and are aligned vertically, such that the members each have the same radius. This is accomplished by providing a cylindrical shaped opening in the layers of the device having an inner radius "$r_1$", which equals the radius of the cathode and gate members, and an outer radius "$r_2$". The cylindrical opening has a depth "d" from the upper surface of the device 80 and terminates at a level above layer 82 to prevent electrical contact between the anode member subsequently disposed therein and base contact 84. As with the previous embodiments, a spacer material 95 (such as paralyene) of preselected thickness separates the cathode 90 from the anode member 96 disposed within the cylindrical opening. Also, although not depicted, in completing device 80 this spacer material is preferably evaporatively removed as described above. Further, a gas could be disposed within the space between the anode and cathode members or a vacuum could be created therein as explained above. Finally, a portion of insulating layer 88 and 94 could be etched between the gate and cathode members to reduce the capacitive coupling therebetween.

One fabrication approach to producing the circular shaped FED 80 of FIGS. 15*a* and 15*b* is next explained with reference to FIGS. 16*a*–18*b*. Fabrication of device 80 begins by creation of gate member 86 and its supporting electrical connections 85 and 84 in successive layers of dielectric material 82, 83 and 87, such as oxide, overlaid onto substrate 14. First, dielectric layer 82 is disposed on the upper surface 13 of substrate 14 and patterned with metal 84 which is to serve as an external contact means for gate member 86. Next, dielectric layer 83 is disposed over layer 82 and patterned with metal "stud-up" contacts 85. Finally, the gate structure is completed by disposition of a dielectric layer 87 on layer 83 and the patterning thereof for gate member 86. Although shown with the same radius in FIGS. 16 as in FIGS. 15, gate member 86 could have a larger radius than radius "$r_1$" at this fabrication stage and be subsequently cut back to radius "$r_1$" with the creation of the cylindrical opening to accommodate anode member 96 as described above (see FIGS. 15*a* and 15*b*). Obviously, it is not necessary that the gate member be circular at this processing stage.

Next, a thin oxide layer 88, for example on the order of 1000 angstroms, is deposited on layer 87. Following which a very thin layer of metal is disposed by physical vapor deposition to define cathode 90 (FIGS. 17*a* and 17*b*). As with the previous cathodes, this structure preferably comprises tungsten or titanium nitride and has a thickness of only several hundred angstroms. If desired, the cathode could be fabricated with a rectangular or square configuration as long as all dimensions from the center axis exceed "$r_1$" (FIG. 15*b*), and preferably, are less than "$r_2$". The cathode is then encapsulated in an oxide layer 94 and an external contact or "stud-up" is provided to the upper surface of device 80 therethrough (FIGS. 18*a* and 18*b*).

Simultaneous with patterning of external contact layer 92, an opening for the anode metallization layer can be accomplished. As indicated above, this opening is etched to have a cylindrical shape with an inner radius "$r_1$" and an outer radius "$r_2$". Prior to disposition of the anode metallization, the inner vertical wall of the opening could be processed to undercut a portion of the insulating layer 88 disposed between gate member 86 and cathode member 90, as discussed in connection with the previous FED embodiments. Again, this is principally undertaken to reduce capacitive coupling effects between the cathode member and the gate member. Thereafter, a conformal layer of a spacer material, such as paralyene, is disposed on all surfaces of the device, and subsequently removed from any horizontal surface such that the material remains only on the vertical walls of the cylindrical opening. Next, anode metallization is accomplished in the conventional manner.

One processing note of interest is that the depth "d" (FIG. 15*b*) of the cylindrical opening can be defined by ascertaining the point during processing when gate member 86 is being etched and thereafter conducting a time controlled etch into dielectric layer 83. This is to prevent anode member 96 from contacting base plate 84.

A final external metallization contact to base plate 84 can be provided as described previously. Also, as a further extension of this circular lateral FED concept, the "cathode-up" and "cathode-down" field emission devices which are known in the open literature can be formed in a similar fashion. For example, in such devices the cathode (emitter) could become a cylinder, with the result that the circular cathode shape can be used in any class of field emission device. Those skilled in the art will recognize that the circular cathode configuration maximizes current density over any single tip cathodes known in the art. In effect, the circular configuration provides a $2\pi$ tip. Further, this configuration optimizes the lateral area of the device since $2\pi r$ is the maximum perimeter for a given area.

As a further enhancement to the basic field emission devices discussed herein, integration of these devices into integrated structures residing on a single substrate using shared elements in both vertical and lateral directions is possible. Such integrated structures: (1) provide improved component density by several orders of magnitude over single field emission devices; (2) reduce the number of interconnections necessary between devices, thereby reducing costs; and (3) improve reliability and performance, and enable significant design flexibility. Using the concepts set forth below, simultaneous horizontal and vertical integration of field emission devices can be accomplished.

Figure 19A:
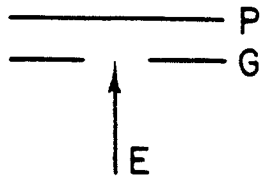
FIGS. 19a-19c schematically depict an emitter-up field emission device, an emitter-down field emission device and a lateral cathode field emission device, respectively.
Figure 19B:
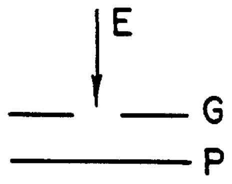

As used herein, field emission devices are divided into one of three classes namely emitter-up (FIG. 19*a*), emitter-down (FIG. 19*b*), and lateral cathode classifications are known in the art, while the new lateral cathode class is discussed in detail herein. In the emitter-up class, the anode member is disposed above the cathode member (which is perpendicular to and pointed away from the substrate), while in the emitter-down class, the anode member is disposed below the cathode member (which is perpendicular to and pointed towards the substrate). In the lateral cathode class, the cathode and anode are disposed laterally relative to the substrate.

Figure 20A:
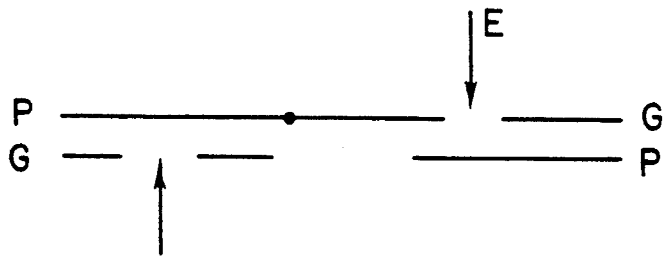
FIG. 20a is a schematic of an integrated structure combining an emitter-up field emission device with an emitter-down field emission device by coupling the anode of the emitter-up field emission device to the gate of the emitter-down field emission device.
Figure 20B:
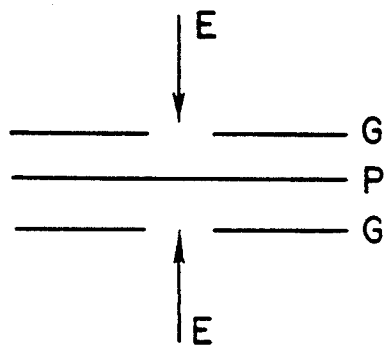
FIG. 20b is a schematic of an integrated structure combining an emitter-up field emission device and an emitter-down field emission device by coupling the anode of the emitter-up field emission device to the anode of the emitter-down field emission device.

By combining FEDs, different cathode type devices (including diode and triode configurations) at different times in a lateral and vertical sense are possible as desired to meet predefined circuit requirements. For example, one typical fan out of a device to another may be achieved by attaching the plate (P) (i.e., anode or anode member) of an emitter-up device to the gate (G) of an emitter-down device. This structure is shown in FIG. 20*a*, wherein the metallization layer comprising the anode of the emitter-up device simultaneously comprises the gate of the emitter-down device. Those skilled in the art will recognize from the open literature and the description provided herein that this structure can be readily accomplished with existing microelectronic fabrication techniques. FIG. 20*b* depicts an integrated structure wherein an emitter-up device and an emitter-down device are coupled through the sharing of a common anode. This device in effect places two separate FEDs in the same lateral space as one. Fabrication is accomplished by starting with creation of an emitter-up device and then disposing an emitter-down device thereon using the common plate.

Figure 21B:
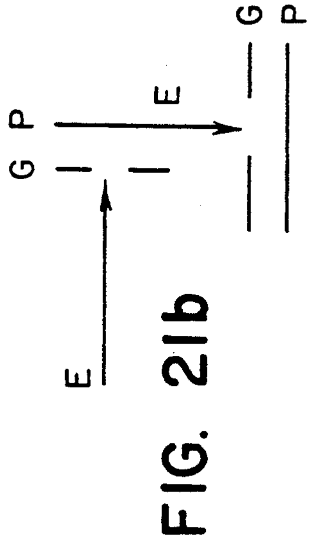
FIG. 21b is a schematic of an integrated structure combining a lateral emitter field emission device and an emitter-down field emission device by coupling the anode of the lateral emitter field emission device to the emitter of the emitter-down field emission device.
Figure 21C:
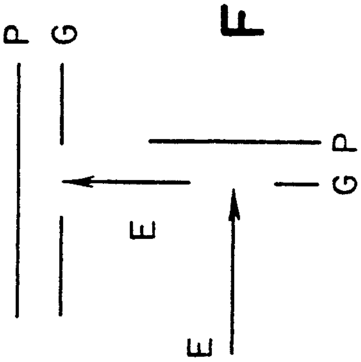
FIG. 21c is a schematic of an integrated structure combining a lateral emitter field emission device and an emitter-up field emission device by coupling the gate of the lateral emitter field emission device to the emitter of the emitter-up field emission device.
Figure 21A:
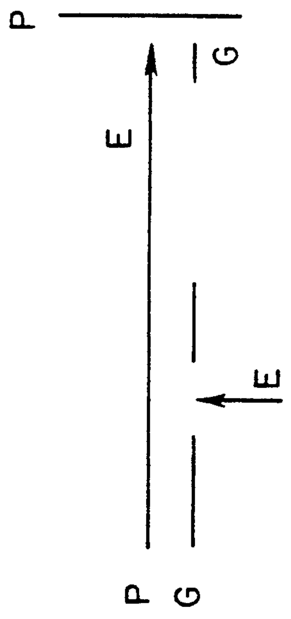
FIG. 21a is a schematic of an integrated structure combining an emitter-up field emission device with a lateral emitter field emission device by coupling the anode of the emitter-up field emission device to the emitter of the lateral emitter field emission device.

FIGS. 21*a*–21*c* depict integrated structures wherein one of the FEDs comprises a lateral field emission device. In FIG. 21*a*, the anode of an emitter-up device becomes the emitter (E) of the lateral cathode device. In this structure, process flow could use the gate level of the emitter-up structure as the gate level of the lateral cathode structure. Note also, that since the anode of an emitter-up structure is relatively thick, the desired ultra-thin lateral cathode is separately deposited over it to make connection.

FIG. 21*b* depicts an integrated structure wherein the cathode of an emitter-down device becomes the anode of a lateral cathode device. In this configuration, the emitter-down structure would be fabricated first on the substrate, and the devices are coupled simply by aligning the lateral cathode device process over the performed emitter-down device process.

FIG. 21*c* is a schematic of an integrated structure wherein the upper gate of a lateral cathode device is connected directly to the cathode of an emitter-up device. Again, this is accomplished simply by building the lateral cathode device first and aligning the emitter-up device thereon such that the cathode aligns with the gate. Alternatively, the integrated structure could be formed by extending the gate of the lateral emitter and then shaping it to form the emitter of the emitter-up device.

Figure 22:
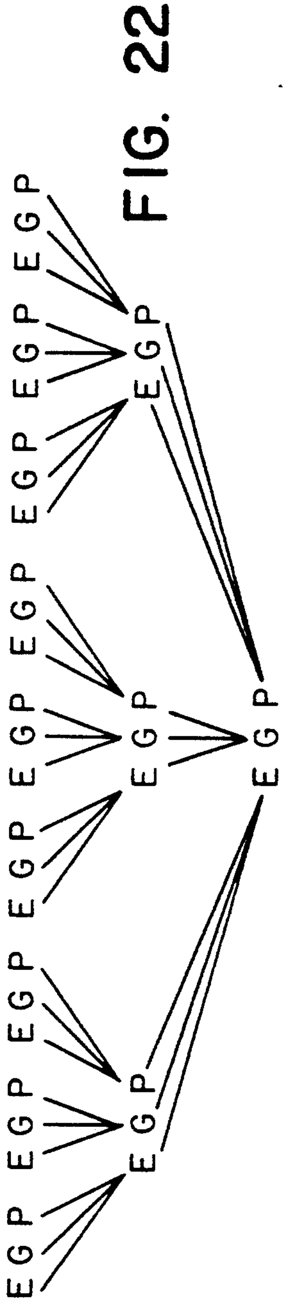
FIG. 22 is a representation of the various integrated circuit combinations possible using three field emission devices of the emitter-up field emission device, emitter-down field emission device and lateral emitter field emission device classifications.

Those skilled in the art will recognize that a multitude of integrated FED structure possibilities exist. As shown in FIG. 22, with just three FEDs twenty-seven possible integrated structure configurations can be constructed. Again, in each of these configurations there is no separate interconnection between FEDs. Rather, the metallization layer or element of one FED in essence becomes an element of another FED. The cathode, gate, and anode in effect are the interconnections. Each of the possible configurations outlined is believed achievable without significant process modifications. It will be observed that this aspect of the present invention provides significant design flexibility.

Although all combinations may not be desired at all times for practical reasons, certain combinations can be made to work most of the time. Again, by integrating the three cathode type devices together, interconnections normally required as a separate step are made automatically by the device elements themselves and thus enhanced density and increased circuit performance (for example, from lowered interconnection resistance, etc.) is obtained.

From the above description, it will observed that lateral field emission devices are set forth which can be built using existing microelectronic fabrication techniques and which have extremely fine cathode tips. Further, the devices described have spacer controlled cathode to anode distances and film controlled cathode to gate distances. The gate and cathode structures are inherently aligned and the anode structure is self-aligned to the gate and cathode. Further, the devices described have improved layout density, and increased active current is possible to produce higher power output per unit area where desired. The integrated structure approach set forth beneficially reduces the number of interconnections between multiple devices, thereby reducing cost, and increasing device reliability and performance, along with offering significant design flexibility.

Although specific embodiments of the present invention have been illustrated in the accompanying drawings and described in the foregoing detailed description, it will be understood that the invention is not limited to the particular embodiments described herein, but is capable of numerous rearrangements, modifications, and substitutions without departing from the scope of the invention. The following claims are intended to encompass all such modifications.

We claim:

1. A method of fabricating a field emission device, said method comprising the steps of:

(a) disposing a first metallic layer relative to the upper surface of a substrate, said first metallic layer being disposed so as to extend parallel to the upper surface of said substrate and have a thickness of only several hundred angstroms;

(b) overlying a first insulating layer on said first metallic layer;

(c) providing an opening through said first metallic layer and said first insulating layer disposed thereon;

(d) disposing a conformal layer of material only on the walls of said said opening provided in step (c), said conformal layer being of predetermined thickness;

(e) filling said opening at least partially with a second metallic layer such that said conformal layer spaces said second metallic layer from said first metallic layer, said predetermined conformal layer thickness equaling a desired spatial distance between said first and second metallic layers; and (f) providing means for applying an electrical bias voltage to said first metallic layer and to said second metallic layer, said bias voltage to be applied being sufficient to cause cold cathode emission of electrons from said first metallic layer to said second metallic layer.

2. The fabrication method of claim 1, further comprising the step of:

disposing a dielectric material on the upper surface of said substrate prior to said first metallic layer disposing step (a).

3. The fabrication method of claim 2, further comprising the steps of:

patterning said dielectric material disposed on the upper surface of said substrate and etching said dielectric material to form an opening for a base metallization, said opening being at least partially aligned beneath said first metallic layer to be disposed thereon; and metallizing said etched opening in said dielectric material to produce said base metallization, said base metallization being in electrical contact with said first metallization layer.

4. The fabrication method of claim 3, further comprising the step of removing said conformal layer from between said first metallic layer and said second metallic layer.

5. The fabrication method of claim 4, further comprising the steps of:

disposing a third metallic layer on said first insulating layer, said third metallic layer being positioned to overlie at least a portion of said first metallic layer;

overlying a second insulating layer on said third metallic layer; and providing means for applying an electrical bias voltage to said third metallic layer, wherein said third metallic layer functions as gate control for said first metallic layer.

6. The fabrication method of claim 5, wherein said filling step (e) produces a second metallic layer having a height from the upper surface of said substrate approximately the same as the combined height from the upper surface of said substrate of said first and third metallic layers and said first and second insulating layers.

7. The fabrication method of claim 6, further comprising the steps of:

disposing dielectric material on the upper surface of said substrate prior to said first metallic layer disposing step (a);

patterning said dielectric material and etching said material to form a first opening for a base metallization and a second opening for a lower gate metallization, each of said openings being at least partially aligned beneath said first metallic layer to be disposed thereon;

metallizing each said etched openings in said dielectric material to produce said base metallization and said lower gate metallization;

disposing a spacer dielectric material over said base dielectric material for separating said lower gate metallization from said first metallization layer; and providing a metallization layer within said spacer dielectric for electrical coupling of said base metallization and said first layer metallization.

* * * * *

UNITED STATES PATENT AND TRADEMARK OFFICE

CERTIFICATE OF CORRECTION

PATENT NO. : 5,308,439

DATED : May 3, 1994

INVENTOR(S) : Cronin et al.

It is certified that error appears in the above-indentified patent and that said Letters Patent is hereby corrected as shown below:

On the Title Page:

Item [54] delete "LATERNAL" and substitute therefor --LATERAL--
delete "EMMISSION" and substitute therefor --EMISSION--

Column 1, line 2, delete "LATERNAL FIELD EMMISSION DEVICES AND" and substitute therefor --LATERAL FIELD EMISSION DEVICES AND--.

Figure 19C:
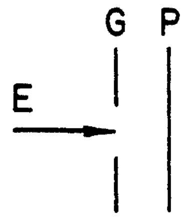

Column 14, line 6, between "cathode" and "classifications" insert --(FIG. 19c) devices. The emitter-up and emitter-down--.

Signed and Sealed this

Twenty-third Day of August, 1994

Attest:

BRUCE LEHMAN

*Attesting Officer*

*Commissioner of Patents and Trademarks*